(12) United States Patent
Chen et al.

(10) Patent No.: US 9,870,327 B2
(45) Date of Patent: Jan. 16, 2018

(54) MESSAGE-BASED MEMORY ACCESS APPARATUS AND ACCESS METHOD THEREOF

(71) Applicant: Huawei Technologies Co., Ltd., Shenzhen, Guangdong (CN)

(72) Inventors: Mingyu Chen, Beijing (CN); Yuan Ruan, Beijing (CN); Zehan Cui, Beijing (CN); Licheng Chen, Beijing (CN); Yongbing Huang, Beijing (CN); Mingyang Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 14/335,029

(22) Filed: Jul. 18, 2014

(65) Prior Publication Data

US 2015/0006841 A1 Jan. 1, 2015

Related U.S. Application Data

(63) Continuation of application No. PCT/CN2013/070710, filed on Jan. 18, 2013.

(30) Foreign Application Priority Data

Jan. 18, 2012 (CN) .......................... 2012 1 0016351

(51) Int. Cl.
*G06F 13/16* (2006.01)
*G06F 13/42* (2006.01)

(52) U.S. Cl.
CPC ...... *G06F 13/1673* (2013.01); *G06F 13/4239* (2013.01)

(58) Field of Classification Search
CPC .......... G06F 13/1689; H04L 29/08072; H04L 29/06; G04L 29/0809
See application file for complete search history.

(56) References Cited

U.S. PATENT DOCUMENTS 4,667,286 A * 5/1987 Young ................... G06F 3/0601
  711/113
5,444,718 A * 8/1995 Ejzak .................... H04L 1/1614
  714/748

(Continued)

FOREIGN PATENT DOCUMENTS

CN 1928839 A 3/2007
CN 101105786 A 1/2008
(Continued)

*Primary Examiner* — Midys Rojas
*Assistant Examiner* — Khoa D Doan

(57) ABSTRACT

A message-based memory access apparatus and an access method thereof are disclosed. The message-based memory access apparatus includes: a message-based command bus, configured to transmit a message-based memory access instruction generated by the CPU to instruct a memory system to perform a corresponding operation; a message-based memory controller, configured to package a CPU request into a message packet and sent the packet to a storage module, and parse a message packet returned by the storage module and return data to the CPU; a message channel, configured to transmit a request message packet and a response message packet; and the storage module, including a buffer scheduler, and configured to receive the request packet from the message-based memory controller and process the corresponding request.

20 Claims, 13 Drawing Sheets

(56) References Cited

U.S. PATENT DOCUMENTS

| | | | | |
|---|---|---|---|---|
| 5,559,956 A * | 9/1996 | Sukegawa | G06F 12/0246 | 711/E12.014 |
| 5,881,264 A * | 3/1999 | Kurosawa | G06F 13/1689 | 712/217 |
| 5,924,126 A * | 7/1999 | Rosenthal | G06F 12/1081 | 710/3 |
| 6,148,366 A * | 11/2000 | Watanabe | G06F 3/061 | 710/57 |
| 6,253,297 B1 * | 6/2001 | Chauvel | G06F 13/28 | 711/154 |
| 6,266,723 B1 * | 7/2001 | Ghodrat | G06F 13/423 | 710/1 |
| 6,381,658 B1 * | 4/2002 | Swaminathan | G06F 13/1642 | 370/412 |
| 6,505,276 B1 | 1/2003 | Motomura | | |
| 6,510,474 B1 * | 1/2003 | Stracovsky | G06F 12/0215 | 710/116 |
| 6,526,484 B1 * | 2/2003 | Stacovsky | G06F 13/1626 | 710/39 |
| 6,539,467 B1 * | 3/2003 | Anderson | G06F 9/30014 | 711/149 |
| 6,621,829 B1 * | 9/2003 | Achilles | H04L 12/5693 | 370/235 |
| 6,745,319 B1 * | 6/2004 | Balmer | G06F 9/30025 | 708/212 |
| 6,754,682 B1 * | 6/2004 | LeCrone | G06F 11/1466 | 707/999.204 |
| 6,832,279 B1 * | 12/2004 | Potter | G06F 13/405 | 710/112 |
| 7,296,143 B2 * | 11/2007 | Gaskins | G06F 9/4403 | 711/104 |
| 7,688,838 B1 * | 3/2010 | Aloni | G06F 13/128 | 370/395.7 |
| 7,826,470 B1 * | 11/2010 | Aloni | H04L 49/90 | 370/419 |
| 7,835,380 B1 * | 11/2010 | Aloni | H04L 12/40032 | 370/394 |
| 8,478,907 B1 * | 7/2013 | Aloni | G06F 13/128 | 709/225 |
| 9,142,280 B1 * | 9/2015 | Pandey | G11C 11/40615 | |
| 9,244,824 B2 * | 1/2016 | Lim | G06F 12/00 | |
| 2001/0009531 A1 | 7/2001 | Farmwald et al. | | |
| 2002/0107939 A1 * | 8/2002 | Ford | H04L 29/06 | 709/218 |
| 2004/0073703 A1 * | 4/2004 | Boucher | H04L 69/16 | 709/245 |
| 2004/0078502 A1 * | 4/2004 | Hsin | G06F 13/4217 | 710/62 |
| 2004/0139286 A1 * | 7/2004 | Lin | G06F 13/1631 | 711/151 |
| 2005/0210185 A1 * | 9/2005 | Renick | G06F 13/161 | 711/105 |
| 2006/0036817 A1 * | 2/2006 | Oza | G06F 9/3816 | 711/155 |
| 2006/0095646 A1 | 5/2006 | Gower et al. | | |
| 2006/0123206 A1 * | 6/2006 | Barrett | G06F 13/1626 | 711/158 |
| 2006/0143403 A1 * | 6/2006 | Barrett | G06F 12/0817 | 711/141 |
| 2007/0016698 A1 | 1/2007 | Vogt | | |
| 2007/0061519 A1 * | 3/2007 | Barrett | G06F 13/1663 | 711/141 |
| 2007/0150616 A1 * | 6/2007 | Baek | H04L 12/2803 | 709/246 |
| 2007/0174850 A1 * | 7/2007 | El Zur | G06F 13/385 | 719/321 |
| 2007/0255928 A1 * | 11/2007 | Fukai | G06F 9/30043 | 711/220 |
| 2007/0271424 A1 | 11/2007 | Lee et al. | | |
| 2008/0059705 A1 * | 3/2008 | Begon | G06F 12/0859 | 711/118 |
| 2008/0104340 A1 * | 5/2008 | Shih | G06F 13/161 | 711/154 |
| 2008/0209105 A1 * | 8/2008 | Hara | G06F 12/0215 | 711/101 |
| 2008/0320254 A1 * | 12/2008 | Wingard | G06F 12/0607 | 711/157 |
| 2009/0031073 A1 * | 1/2009 | Diggs | G06F 3/0607 | 711/103 |
| 2009/0132757 A1 * | 5/2009 | Lin | G06F 12/0804 | 711/103 |
| 2009/0164998 A1 * | 6/2009 | Stevens | G06F 1/3206 | 718/101 |
| 2009/0193203 A1 * | 7/2009 | Brittain | G06F 13/4243 | 711/158 |
| 2009/0193290 A1 * | 7/2009 | Arimilli | G06F 12/0802 | 714/6.32 |
| 2009/0271532 A1 * | 10/2009 | Allison | G06F 11/1004 | 710/7 |
| 2010/0057963 A1 * | 3/2010 | Tsuji | G06F 13/1605 | 710/116 |
| 2010/0077168 A1 * | 3/2010 | Arakawa | G06F 12/0223 | 711/165 |
| 2010/0082877 A1 * | 4/2010 | Takizawa | G06F 13/161 | 711/5 |
| 2010/0153611 A1 | 6/2010 | Rau | | |
| 2010/0318716 A1 * | 12/2010 | Nguyen | G06F 13/4027 | 710/314 |
| 2011/0082985 A1 * | 4/2011 | Haines | G06F 12/0246 | 711/154 |
| 2011/0126081 A1 | 5/2011 | Kasamsetty et al. | | |
| 2012/0159002 A1 * | 6/2012 | Imai | G06F 13/1689 | 710/5 |
| 2012/0226827 A1 * | 9/2012 | Raju | G06F 13/385 | 710/5 |
| 2013/0073608 A1 * | 3/2013 | Hu | H04L 67/26 | 709/203 |
| 2013/0136033 A1 * | 5/2013 | Patil | H04W 84/18 | 370/255 |
| 2014/0040518 A1 * | 2/2014 | Udipi | G06F 13/1605 | 710/117 |
| 2014/0215189 A1 * | 7/2014 | Airaud | G06F 9/30014 | 712/208 |
| 2014/0215560 A1 * | 7/2014 | Roberson | H04L 63/02 | 726/3 |
| 2015/0249609 A1 * | 9/2015 | Boucher | H04L 12/5693 | 710/308 |

FOREIGN PATENT DOCUMENTS

| | | |
|---|---|---|
| CN | 101853238 A | 10/2010 |
| CN | 102541779 A | 7/2012 |
| CN | 102609378 A | 7/2012 |
| JP | 2007529828 | 10/2007 |
| JP | 2008547099 | 12/2008 |
| JP | 2011034214 A | 2/2011 |
| JP | 2012529103 | 11/2012 |
| KR | 20030016558 A | 3/2003 |
| WO | WO 99/30240 A1 | 6/1999 |
| WO | WO 2005/089418 A2 | 9/2005 |
| WO | WO 2010/141059 A2 | 12/2010 |
| WO | WO 2011/046677 A2 | 4/2011 |

* cited by examiner

| Item number | Request address | Request length | Timed delay | Returning granularity | Data state | Data location | Other |
|---|---|---|---|---|---|---|---|
| | | | | | | | |

FIG. 8

MESSAGE-BASED MEMORY ACCESS APPARATUS AND ACCESS METHOD THEREOF

CROSS-REFERENCE TO RELATED APPLICATION

This application is a continuation of International Application No. PCT/CN2013/070710, filed on Jan. 18, 2013, which claims priority to Chinese Patent Application No. 201210016351.2, filed on Jan. 18, 2012, both of which are hereby incorporated by reference in their entireties.

TECHNICAL FIELD

The present invention relates to the field of computer system design, and in particular, to a message-based memory access apparatus and an access method thereof.

BACKGROUND

The memory system of a computer is one of the important elements that have an impact on the system structure and software performance. In the past decades, as the gap between processor performance and memory performance has become larger and larger, the memory system has been the bottleneck that restricts system performance. In recent years, along with the evolution of processors to multi-core and many-core structures, the access bandwidth problem of memory systems becomes more severe, which restricts the further development of the scope of multi-core processors.

In the past years, the main approaches for improving an effective access bandwidth are to improve a bus frequency and to increase the number of data channels, that is, to increase a physical bandwidth. However, a synchronous-bus-based memory access structure has no big change in these years. An SDRAM (Synchronous Dynamic Random Access Memory, synchronous dynamic random access memory) appeared in the mid-1990s, then it was developed to SDRAM, DDR (Double Data Rate), DDR2, and DDR3, and now DDR4 is going to be issued. The SDRAM uses synchronous interfaces, and all requests need to wait for a fixed clock period to obtain responses. Since the SDRAM has been issued, the memory bus structure hardly has had any essential change. Basically, the SDRAM is developed based on the improvement of the bandwidth through consistent enhancement of an interface frequency.

At present, attempts to change the memory structure have been made in an international scale. For example, in the RDRAM and XDR (Extreme Data Rate) technologies of Rambus, a packet-based request/response protocol is used, and a serial memory bus that is relatively narrow but has a high data rate is used to transmit data packets. An advanced memory buffer (AMB, Advanced Memory Buffer) is added on the Dual Inline Memory Module (DIMM) of FB-DIMM (Fully Buffered-DIMM) of Intel so that FB-DIMM may be connected to memory controllers or AMBs on neighboring DIMMs through a high-speed serial channel. Similar all-data buffer is used in LRDIMM (Load-Reduced DIMM), DDR4, and other technologies to improve the quality of high frequency signals. However, these attempts just partially change the memory structure. To be specific, data transmission is converted from the parallel bus format to the packet format, but a synchronous access protocol is still required in terms of timing sequence.

On one hand, the existing synchronous memory systems are mainly designed for ensuring that the delay of a single memory access is fixed and low. However, when a multi-core structure is used, the memory access delay actually includes two parts, waiting time in the memory access queue of a processor and a delay on a memory access channel. Apparently, a low delay on a memory access channel cannot ensure good overall memory access performance.

On the other hand, the data granularity of conventional memory access is fixed and has a tendency of increase. This is for ensuring that more data is transmitted in one transmission period and the data read each time is basically of the length of the CPU Cache line. However, in an actual program, the actual granularity for each data access varies. For some application data accesses that are irregular with a low granularity, the fixed large data granularity for each access inevitably causes a waste; when a large amount of data needs to be read and written for some applications, the data access needs to be divided into a plurality of memory transactions, thereby increasing protocol overhead. These all cause a waste of a memory access bandwidth.

SUMMARY

To resolve the foregoing problem, this document provides a message-based memory access apparatus and an access method thereof.

The purpose of the present invention is to improve the effective utilization rate of CPU memory channels and provides a message-based memory access apparatus and an access method thereof.

The present invention discloses a message-based memory access apparatus, including:

a message-based command bus, configured to transmit a message-based memory access instruction generated by a CPU to a message-based memory controller, and instruct the message-based memory controller to perform a corresponding operation based on the message-based memory access request;

the message-based memory controller, configured to package the message-based memory access request into a message packet and send the request packet to a storage module, and parse a message packet returned by the storage module to obtain data corresponding to the response packet and return the data to the CPU;

a message channel, configured to transmit the request message packet to the storage module and transmit the response message packet to the message-based memory controller; and the storage module, including a buffer scheduler, and configured to receive a request packet from the message-based memory controller and process the corresponding request.

The message-based command bus is further configured to specify a memory access length of a request, and the memory access length is greater than or less than the length of a register;

requested data is returned to a cache, a CPU addressable buffer, or a register or register group without passing by a cache; and a request is attached with information about a data access priority for instructing scheduling of a memory access command in the message-based memory controller and the buffer scheduler, so as to provide a scheduling basis for a memory system.

The message-based memory controller further includes:

a memory access request interface, configured for request exchange between the CPU and the message-based memory controller;

a read/write request reservation station, including a request state table, where the request state table consisting of two parts: a read request state table and a write request state table, configured to assign a table entry for each newly received request, wherein a corresponding table entry in the request state table needs to be updated or deleted when the buffer scheduler responds to a request or the message-based controller sends a request response to the CPU;

a read/write request distributor, configured to control, according to a state of a read/write request reservation station, whether a memory access request received from the memory access request interface is inserted into the read request state table or the write request state table, where, if a write request is received, data to be written in a memory needs to be temporarily saved in a write data buffer; and the write data buffer, configured to temporarily save data of the write request;

a read data buffer, configured to temporarily save data of the read request.

The message-based memory controller further includes:

a request generating and scheduling component, on one hand, configured to generate a plurality of small requests according to request attributes in the request state table, such as a request length and a timed delay; and on the other hand, configured to schedule requests, select a next request to be processed among unprocessed requests in the read request state table and the write request state table, and send the selected request to a message packetizer;

the message packetizer, configured to package one or more requests into a message packet on the message channel and send the message packet through the message channel interface to the buffer scheduler;

a message unpacker, configured to extract one or more requests from a message packet and parse corresponding data content of each request;

a request state update unit, configured to update a state table of a request in the read/write request reservation station and temporarily save the data in the read data buffer according to the request and the corresponding data obtained by parsing of by the message unpacker;

a request response controller, configured to send a request response to the CPU;

a controller configuration interface, configured to configure a parameter of the message-based memory controller or specify attributes of a request, where corresponding values in the attributes in the read and write request state tables are updated after configuration of a request or a memory access address; and a message channel interface, configured to transmit message packets with the buffer scheduler, where based on a different physical implementation of a message channel, the message channel interface has a corresponding interface type.

In the read/write request reservation station, an item number of the read request state table corresponds to a sequence number of a request in the request state table; the item number is used in a message packet of the message-based memory controller and the buffer scheduler to uniquely specify a request for processing; a request address is the base address of the memory to be accessed; a timed delay specifies the time for returning the request to the CPU and is mainly set through the controller configuration interface; a returning granularity consists of the length of data returned by the message-based memory controller to the CPU each time; a data state specifies required data that has been obtained from the storage module and required data that are not obtained; a data location specifies a location of obtained request data in the read data buffer.

The request response controller is further configured to query for a state of a request in the read/write request reservation station, send a request response to the CPU after a CPU request is processed by the buffer scheduler and the storage module, and if a read request is processed, send corresponding data of the request in the read data buffer.

Interaction between the message-based memory controller and the storage module is completed based on a message packet; each such message packet includes information about one or more memory access requests or responses; a request in the message packet has no synchronous timing sequence restriction but information about a maximum delay of returning the request.

The message-based memory controller configuration interface unit provides special command address space for the message-mode memory controller, allows configuration of attributes of the controller, allows settings of attributes of a memory access request, and issues a corresponding memory access command.

The message-based memory access controller is further configured for the message-based memory access controller and command address space to support, by using a corresponding memory access command, that the memory access system periodically pushes data to the register or the addressable high-speed buffer, and that a simple arithmetic and logic operation and a move operation are performed in the memory system, where memory access atomicity is set, or the operations is performed in batches;

the read/write request reservation station provides a read request state table and a write request state table, where each request to be processed has a corresponding table entry in the read or write request state table, each table entry includes not only the address and length of the request but also the timed return delay, returning granularity, data state, and data location, and in a message packet, each request is determined by the unique item number in corresponding request state table;

the message-based memory controller not only allows a plurality of requests to be included in one message packet, but also allows each request to be divided and included in one or more message packets to be sent to the storage module; the message-based memory controller also allows the storage module to use one or more message packets to process one request; and for the message-based memory controller, a plurality of message packets of a plurality of requests or one request is returned out of order.

The message-based memory controller is further used in the following situation: if message packets of a plurality of storage modules are used to respond to one read request, the data state in the corresponding read request state table of the request identifies the returned data and the unreturned data; and data that is not completely returned is saved in the addressable buffer or the unaddressable buffer, where if the data is temporarily saved in the unaddressable buffer, the read request of the CPU is responded to and the requested data are sent to the CPU only after the requested data are completely returned; and if the data is temporarily saved in the addressable buffer, the CPU reads the returned data part.

The message packets include: a memory access read/write request packet, a special command request packet, a memory state query packet, and/or a response packet.

The buffer scheduler in the storage module includes:

a message channel interface, configured to transmit message packets with the message-based memory controller;

a message unpacker, configured to obtain formation about a memory access request from a received message packet, where the information includes a request serial number, a request type, request semantic information, an address, and data, and the message unpacker performs the unpacking operation according to the corresponding rules after determining the request type;

a request distributor, configured to distribute a memory access request parsed by the message unpacker into a request queue, where the scheduling depends on semantic information, required returning time, and granularity information of access data of each request;

read/write request queues, configured to save unprocessed read/write requests and consists of queues with different priorities, where a high-priority queue saves read/write requests whose access data is of a small granularity and required returning time is short or read/write requests marked with a high priority; and a low-priority queue saves read/write requests whose access data is of a larger granularity and required returning time is long or read/write requests marked with a low priority;

a special request queue, configured to save unprocessed non-read/write requests;

a request scheduler, configured to obtain a memory access request from a request queue and forward the request to a command generating unit; and obtain returned memory access data from the data buffer and forward the data to a message packetizer;

a command generating unit, configured to obtain a memory access request that needs to be immediately executed after being scheduled, and convert the request into a specific command for accessing a memory chip, and issue a command for maintaining the state of the memory chip as required by the request scheduler;

a message packetizer, configured to obtain returned data and the corresponding request serial number from the request scheduler, generate a response packet, and send the packet back to the message-based memory controller, where, according to marks for the returned data made by the request scheduler, the message packetizer allows a plurality of requests to be packaged into one response packet and sent to the message-based memory controller;

a data buffer, configured to save returned data about accessing a memory chip, from which the request scheduler selects the required data and sends the data to the message packetizer; and a memory chip interface, configured to receive a command for accessing a memory chip from the command generating unit, send the command to the memory chip on the storage module, and, after receiving returned data, save the data in the data buffer.

The buffer scheduler in the storage module further includes:

a timer, configured to output pulses at different time intervals as required and enable clock triggering for the request scheduler and a state maintenance unit as required; and the state maintenance unit, configured to maintain the state of each memory chip connected to the buffer scheduler and issue a power-charging command and/or a refreshing command.

The request scheduler is further configured to complete operations for memory access requests in a high-priority queue according to request situations; the request scheduler labels a plurality of requests with combination marks; when all returned data of the requests is saved into the data buffer, the data is forwarded to the message packetizer for being packaged into one response packet; and for a request with a large memory access data amount in a low-priority queue, the request scheduler divides the request processing into several steps and forward the processing result of each step to the message packetizer for being packaged into one response packet and then returned back.

The storage module is further used in the following situations: for a memory access request from the message-based memory controller, the storage module processes the request with a plurality of steps and returns a plurality of response packets; for a plurality of memory access requests from the message-based memory controller, the storage module processes all the requests and uses one response packet to respond all requests; and the storage module schedules a sequence for executing memory access requests from the message-based memory controller according to priorities of requests, semantic information of requests, and a state of a memory chip on the storage module.

A memory unit of the storage module is a synchronous memory chip and/or a memory chip based on an asynchronous network connection.

Special message-based memory access instructions supported by the buffer scheduler include: a timing push instruction, a simple arithmetic and logic operation in the memory system and a move instruction, and compression storage.

The message channel is configured to transmit messages in message packets with a parallel bus, a point to point serial bus, or networks with other topological structures used.

The present invention further discloses a message-based memory access method, including the following steps:

Step 1001: A CPU issues a memory access request. The CPU specifies an access data length, a priority, and semantic information of the request. The request is any other complex memory access request besides a read/write request.

Step 1002: Determine whether the request includes information about configuration of a message-based memory controller. If yes, go to step 1003; and if not, go to step 1004.

Step 1003: If the request includes information about the configuration of the message-based memory controller, the message-based memory controller performs a proper adjustment according to the configuration information and then schedules and processes the request.

Step 1004: The message-based memory controller packages the memory access request from the CPU into a message packet, which includes a plurality of requests, sends the message packet through a message channel to a buffer scheduler of a corresponding storage module, and makes a record in a read/write request reservation station according to requirements.

Step 1005: A buffer scheduler in the storage module parses the sent message packet, and performs an operation on the memory access request of the CPU.

Step 1006: After the memory access request of the CPU is processed, if there is a record about the request in the read/write request reservation station of the message-based memory controller, clear the record.

Before step 1006, the following steps are further included:

Step 1007: If the memory access request of the CPU is a read request, package the read data into a response packet and send the packet to the message-based memory controller through the message channel. During the response packet packaging process, based on requirements, returned data of one request is packaged into a plurality of response packets, and returned data of a plurality of requests are packaged into one response packet.

Step 1008: The message-based memory controller receives and parses the response packet and saves the data in the response packet into a cache or an internal addressable buffer of the message-based memory controller according to requirements.

Step 1009: The message-based memory controller determines whether response packets for the CPU are all returned. If yes, go to step 1006; and if not, go to step 1008.

After step 1005, the following steps are further included:

Step 1010: The buffer scheduler receives and parses the message packet sent by the message-based memory controller, and fills the memory access request of the CPU into a proper request queue.

Step 1011: The request scheduler in the buffer scheduler schedules a plurality of requests in the request queue and arranges a request execution sequence according to the memory access request of the CPU priority and semantic information.

Step 1012: Convert the scheduled CPU request into a series of commands that conform to a memory granularity standard, and send the commands to a memory interface.

Step 1013: Determine whether the memory access request of the CPU is a complex memory access request. If yes, go to step 1014; and if not, go to step 1016.

Step 1014: If the memory access request of the CPU is a complex memory access request, a processing logic in the buffer scheduler simply processes the data returned by the memory.

Step 1015: After the complex memory access instruction is processed, according to the type of the request, determine whether to write the processed data back into the memory and whether to return the process data to the CPU. If the processed data needs to be written back into the memory, use a series of commands that conform to the memory granularity standard to write the data into the memory; if the processed data needs to be returned to the CPU, package the data into a response packet and send the packet to the message-based memory controller.

Step 1016: If the memory access request of the CPU is not a complex memory access request, determine whether the request is a write request. If yes, go to step 1006; and if not, go to step 1007.

Step 1004 further includes the following steps:

Step 1101: The message-based memory controller receives a read/write request sent by the CPU through a memory access request interface.

Step 1102: A read/write request distributor determines whether the request is a read request. If yes, go to step 1104; and if not, go to step 1103.

Step 1103: If the received request is a write request, determine whether there is an empty item in a write request state table. If yes, go to step 1105; and if not, go to step 1102.

Step 1104: If the received request is a read request, determine whether there is an empty item in a read request state table. If yes, go to step 1106; and if not, go to step 1102.

Step 1105: If the received request is a write request and there is an empty item in the write request state table, distribute a table entry for the request and save the data in the write request into a write data buffer; otherwise, go to step 1102.

Step 1106: If the received request is a read request and there is an empty item in the read request state table, distribute a table entry for the request; otherwise, go to step 1102.

Step 1107: Stop receiving the request and continue to process requests received through a memory access request interface.

The scheduling and processing a request by the message-based memory controller includes the following steps:

Step 1201: A request generating and scheduling component scans the table entries in the read/write request state table.

Step 1202: A request generating and scheduling component queries whether there is any request that is unprocessed and needs to be processed in the read/write request state table. If yes, go to step 1203; and if not, go to step 1201.

Step 1203: If there is an unprocessed request, the request generating and scheduling component divides a big request into a plurality of small requests according to the request attributes in the corresponding request state table, and selects the next request to be processed according to the scheduling algorithm.

Step 1204: Determine whether the request to be processed is a read request. If yes, go to step 1206; and if not, go to step 1205.

Step 1205: If the request to be processed is a write request, obtain the corresponding data of the request from a write data buffer; otherwise, go to step 1206.

Step 1206: A message packetizer packages one or more requests into a message packet.

Step 1207: Send the packaged message to a message channel interface between the message-based memory controller and a buffer scheduler, and then go to step 1201 for the next processing round.

Step 1013 further includes the following steps:

Step 1301: Parse header information of the response packet sent from the buffer scheduler to the message-based memory controller so as to obtain the number of responses in the header and the length of each response for parsing the responses one by one in the following.

Step 1302: Determine whether there is a next response that needs to be parsed. If yes, go to step 1303 to parse the next response; and if not, the response packet parsing ends.

Step 1303: Parse the type and the request identifier of the next response. Responses are processed in different ways according to the request types in the following steps.

Step 1304: Determine whether the response is a memory access read request response. If yes, go to step 1305 for further parsing; and if not, the response is a memory state query request response or a memory access write request response, and then go to step 1306 to obtain the corresponding state information.

Step 1305: Address the response according to the response length specified by the header and obtain the returned data from the memory access read request response.

Step 1306: Address the response according to the response length specified by the header. If the response is a state query request response, obtain the returned state value from the response; if the response is a memory access write request response, update the request attributes in the write request state table. Then the response parsing ends. Go back to step 1302.

Step 1307: Determine, according to whether the packet includes sub-responses, whether the memory access data of the read request is returned after being divided into a plurality of responses by the buffer scheduler. If the data is not divided into a plurality of responses, go to step 1309 to process the memory access read request; and if the data is divided, parse the packet to obtain the number of obtained sub-responses and the identifier of the current sub-response, and then go to step 1308.

Step 1308: Determine whether the current response is the last sub-response of the memory access read request according to whether the identifier of the current sub-response is equal to the number of sub-responses. If yes, go to step 1309 to process the current memory access read request; and if not, the current memory access read request is not processed yet, write the returned data of the current sub-response into the corresponding data buffer, the update data state, data location, and other information in the read request state table, and then go back to step 1302.

Step 1309: Process the current memory access read request, prepare to transmit the data from the message-based memory controller back to the CPU, and then go back to step 1302.

Step 1006 further includes the following steps:

Step 1401: A request response controller scans the read and write request state tables.

Step 1402: Query whether there is any processed request in the write request state table. If yes, go to step 1404; and if not, go to step 1403.

Step 1403: If there is no processed request item in the write request state table, query whether there is any processed request item in the read request state table. If yes, go to step 1404; and if not, go to step 1402.

Step 1404: If there is a processed request in the write request state table or the read request state table, determine whether the processed request meets requirements of request attributes. If yes, go to step 1405; and if not, go to step 1402.

Step 1405: Send a response of the request that meet the requirements of all attributes. The data content of the response also needs to match the returning granularity and other attributes of the request.

Step 1011 further includes the following steps:

Step 1501: A timer triggers, according to a set condition, the request scheduler to prepare to start a new request scheduling process.

Step 1502: Check whether the triggering condition is that chip state maintenance is requested. If yes, go to step 1503; and if not, go to step 1504.

Step 1503: The triggering condition of the timer is that chip state maintenance is required. Issue a chip state maintenance command, and go to step 1509.

Step 1504: Check whether the triggering condition is that a special request queue needs to be processed. If yes, go to step 1505; and if not, go to step 1506.

Step 1505: The triggering condition is that a special request queue needs to be processed. Read the request in the special request queue and convert the request into a series of read/write operations. Modify the request state in the queue or clear the request state after the request is processed. Go to step 1509.

Step 1506: Check whether the triggering condition is that the read/write request queue with the highest priority needs to be processed. If yes, go to step 1507; and if not, go to step 1508.

Step 1507: The triggering condition is that the read/write request queue with the highest priority needs to be processed. Clear all requests in the queue and label all read requests with combination marks. Go to step 1509.

Step 1508: The triggering condition is that a read/write request queue that does not have the highest priority needs to be processed. Access the request in the request queue with the corresponding priority and generate the required read/write operation according to the current state of the read/write request. Modify the request state in the queue or clear the request state after the request is processed. Go to step 1509.

Step 1509: The request scheduling process ends. Wait for the triggering of the next scheduling process by the timer.

The beneficial effect in the present invention is: the conventional synchronous bus transaction is replaced by asynchronous request messages and response messages by changing the original synchronous memory access structure; this improves the concurrency and flexibility of a memory access structure and an application memory access interface, thereby improving the utilization rate of a CPU memory channel.

BRIEF DESCRIPTION OF THE DRAWINGS

FIG. 8 is a format chart of table entries in a read request state table of a message-based memory controller according to the present invention;

DETAILED DESCRIPTION

Figure 1:
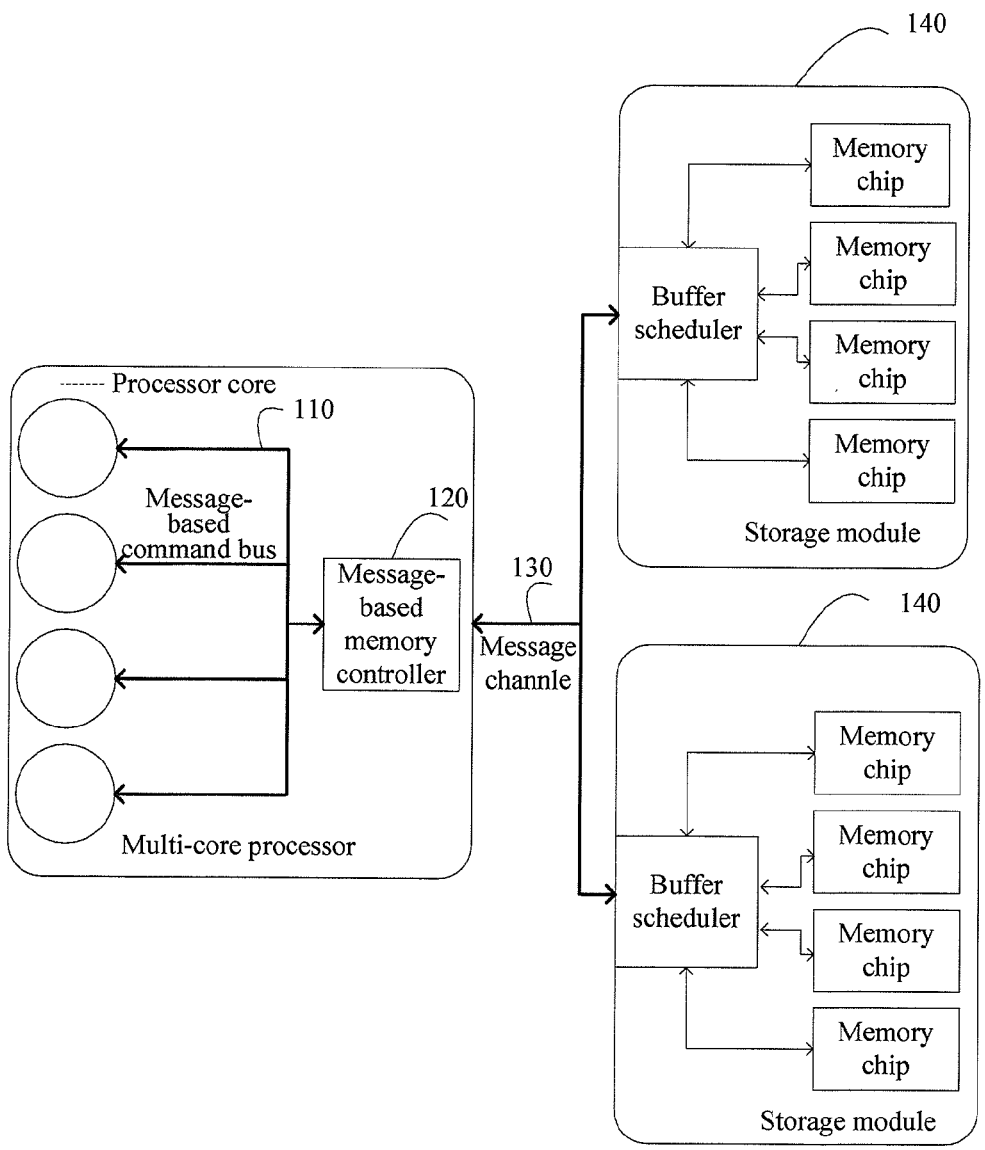
FIG. 1 is an overall structural diagram of a message-based memory access apparatus according to the present invention.

The specific implementation manners of the present invention are hereinafter described in detail with reference to the accompanying drawings.

The purpose of the present invention is to improve the effective utilization rate of CPU memory channels and provides a message-based memory access apparatus.

The starting point of the present invention is that a valid bandwidth may be increased by improving a utilization rate even though a physical bandwidth is restricted. However, a conventional memory system uses a passive synchronous sequence memory access structure with a fixed delay and fixed granularity, which restricts the application of possible effective technical approaches.

The present invention studies a new structure that is based on "message" (message) based. The conventional synchronous bus transaction is replaced by asynchronous and concurrent request messages and response messages by changing the original synchronous memory access structure. This improves the flexibility of a memory access structure and an application memory access interface, thereby improving the utilization rate of a CPU memory channel.

The present invention provides a message-based memory access apparatus, including:

a message-based command bus, configured to transmit a message-based memory access instruction generated by a CPU to instruct a memory system to perform a corresponding operation;

a message-based memory controller, configured to package a CPU request into a message packet and send the packet to a storage module, and parse a message packet returned by the storage module and return data to the CPU;

a message channel, configured to transmit a request message packet and a response message packet; and the storage module, including a buffer scheduler, and configured to receive a request packet from the message-based memory controller and process the corresponding request.

The message-based command bus may specify a memory access length of a request, and the memory access length may be greater than or less than the length of a register.

For the message-based command bus, the requested data may be returned to a cache, an addressable buffer of the CPU, or a register or register group without passing by a cache.

For the message-based command bus, a request may be attached with information about a data access priority for instructing scheduling of a memory access command in the message-based memory controller and the buffer scheduler, so as to provide a scheduling basis for the memory system.

Interaction between the message-based memory controller and the storage module is completed based on a message packet. Each message packet is allowed to include the information or data of one or more memory access requests; a request in a message packet has no synchronous timing sequence restriction, but the request may include the maximum delay of returning the request and other information.

For the message-based memory controller, the controller configuration interface unit provides special command address space for the message-based memory controller, allows configuration of attributes of the controller and setting of attributes of a memory access request, such as the setting of timed return delay and granularity of a memory access request, and allows a special memory access command to be issued.

The message-based memory access controller and command address space, by using a special command, may support that the memory access system periodically pushes data to the register or the addressable high-speed buffer, and that a simple arithmetic and logic operation and a move operation are performed in the memory system, where memory access atomicity may be set, or the operations may be performed in batches.

For the message-based memory controller, the read/write request reservation station provides a read request state table and a write request state table. Each request to be processed has a corresponding table entry in the read request state table or write request state table. Each table entry includes not only the address and length of the request but also the timed return delay, returning granularity, data state, and data location, and other additive attributes of the request. In a message packet, each request is determined by the unique item number in corresponding request state table.

For the message-based memory controller, the message-based memory controller not only allows a plurality of requests to be included in one message packet, but also allows each request to be divided and included in one or more message packets to be sent to the storage module; the message-based memory controller also allows the storage module to use one or more response information packets to process one request.

For the message-based memory controller, a plurality of response message packets of a plurality of requests or one request may be returned out of order.

For the message-based memory controller, if message packets of a plurality of storage modules are used to respond to one read request, the data state in the corresponding read request state table of the request identifies the returned data and the unreturned data. Data that is not completely returned may be saved in the addressable buffer or the unaddressable buffer. If the data is temporarily saved in the unaddressable buffer, the read request of the CPU is responded to and the requested data are sent to the CPU only after the requested data are completely returned; and if the data is temporarily saved in the addressable buffer, the CPU can read the returned data without waiting all data to be returned.

The message packet may include memory access semantic information, including but not limited to thread information, object information, and priority information.

For the message channel, data is transmitted in message packets with a parallel bus, a point to point serial bus, or networks with other topological structures used.

For the storage module including a buffer scheduler, a memory access request sent by a message-based memory controller may be processed with a plurality of steps, and the request may be responded to with a plurality of message packets.

For the storage module including a buffer scheduler, memory access requests sent by a plurality of message-based memory controllers may be responded to with only one message packet after the requests are processed.

The storage module including a buffer scheduler may schedule the execution sequence of memory access requests sent by the message-based memory controller, based on priorities of requests, semantic information of requests, and a state of a memory chip on the storage module.

For the storage module including a buffer scheduler, the buffer scheduler supports special message-based memory access instructions except load/store, including but not limited to a timing push instruction, a simple arithmetic and logic operation in the memory system and a move instruction (supporting an atomic operation and batch processing), and compression storage.

For the storage module including a buffer scheduler, a memory unit in the storage module may be either a synchronous memory chip or a memory chip based on an asynchronous network connection.

To make the objectives, technical solutions, and advantages of the present invention more clearly, the following further describes the message-based memory access apparatus and the message-based memory access method of the present invention with reference to the accompanying drawings and the embodiments of the present invention. It should be understood that the specific embodiments herein are merely intended for describing the present invention rather than limiting the present invention.

As shown in FIG. 1, the message-based memory access apparatus includes a message-based command bus 110, a message-based memory controller 120, a message channel 130, and a storage module 140 including a buffer scheduler; these functional units perform memory access of a CPU by using a message packet; a controllable delay and a variable granularity are achieved, and message-based memory access of semantic information is supported.

A memory access instruction or an access to the special command address space for a CPU is converted into a message-based memory access request on the message-based command bus 110. Compared with conventional Load and Store memory access instructions, the message-based memory access apparatus allows the CPU to specify the size and speed of a memory access data granularity, data returning timing and manner, and other semantic information.

The message-based memory controller 120 schedules received memory access requests, converts the requests into request packets, places the packets on the message channel 130, and maintains the states of all memory access requests that are being processed. When parsing response packets returned on the message channel 130, the message-based memory controller 120 unpacks the response packets to obtain the returned data of the memory access requests.

The storage module 140 receives and processes request packets on the message channel 130 through the buffer scheduler, parses the requests, and accesses the specific memory ship, packages data that needs to be returned into response packets, and sends the response packets to the message-based memory controller 120.

The message-based command bus 110 mainly supports the following three types of message-based memory access instructions:

1. A message-based memory load and store instruction, which is obtained by adding granularity and priority parameters for a common memory load and store instruction. The CPU first sets the memory access data size and access priority at the specified location in the special command address space, and then executes a message-based memory load and store instruction. That is, data of the specified length may be taken out from the memory and saved in the cache based on the required priority.

2. A timed return instruction, allowing the memory system to return data of an array specified by the instruction to a specified register at a regular interval in a subsequent period of time. The CPU first sets the time interval and the return times of memory access at the specified location in the special command address space, and then executes a timed return instruction. During the execution of the instruction, the message-based memory controller or the buffer scheduler generates a required read command periodically, and inserts the command into the command queue or the request queue. Data returned by the memory system is directly sent into the register without passing by the cache. Compared with prefetching, timed return reduces buffer occupation.

3. A simple arithmetic logic operation and a copy instruction in the memory system, supporting atomicity and batch processing. With this instruction, the memory system may perform some simple arithmetic logic operations (addition, subtraction, AND, OR, XOR, and others, where operation results written into a memory unit) and some copying operations on the memory unit without using the CPU. This instruction supports batch processing. It is needed to set parameters of the instruction, such as the type of the operation that the memory system will execute, whether it is an atomic operation, and operation times of batch processing, at the specified location in the special command address space, and then, execute the instruction MOP R1, R2, R3. In the instruction, R1 and R2 store the source operand address, and R3 stores the destination operand address. During the execution of this instruction, the buffer scheduler or the message-based memory controller executes the operations and copying, ensures the atomicity of the operations, and controls the operation times. Simple operations do not require data to be moved to the CPU, thereby reducing a total memory access amount.

Figure 2:
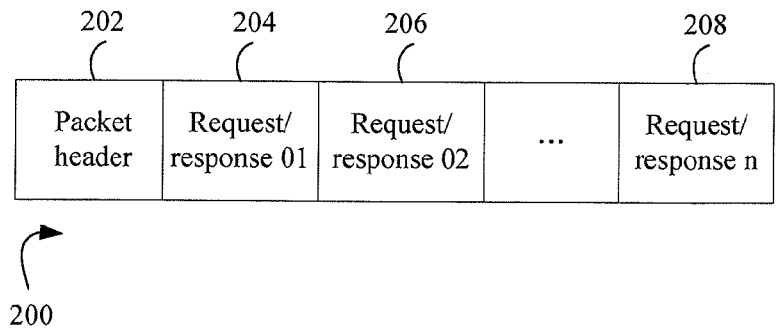
FIG. 2 is a format chart of a message packet transmitted between a message-based memory controller and a storage module according to the present invention.

The message-based memory controller 120 and the storage module 140 communicate with each other by using message packets. The supported types of message packets include a memory access read/write request packet, a special command request packet, a memory state query packet, and a response packet. As shown in FIG. 2, a message packet 200 includes one header 202, and one or more memory access requests or responses 204, 206, and 208. The header 202 specifies metadata of the message packet, such as a packet type, the number of requests, a length of each request, a length of the packet, fault-tolerant information, and others. A memory access read/write request packet sent from the message-based memory controller to the storage module may include one or more memory access read/write requests. Each memory access request including 202, 204, or 206 includes a request identifier, a memory access address, a memory access granularity, and a memory access operation, and may further include some semantic information; besides, a write request further includes data. A response packet sent from storage module to the message-based memory controller may include one or more responses, and each response packet includes a request identifier, returned data, and others.

Figure 3:
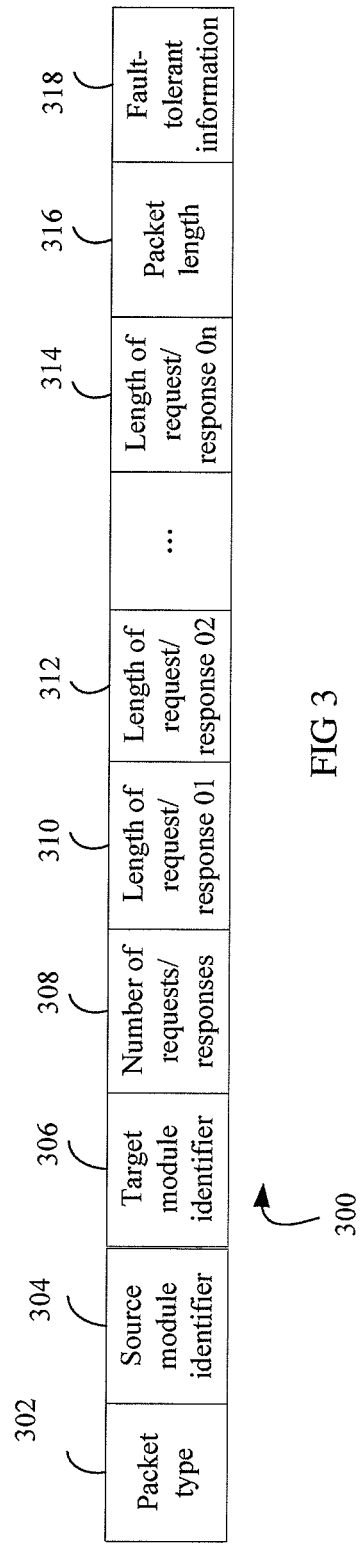
FIG. 3 is a format chart of a header of a message packet according to the present invention.

Each message packet must include a header 300. As shown in FIG. 3, header information includes: a packet type 302, a source module identifier 304, a target module identifier 306, the number 308 of included requests/responses, a length 310, 312, or 314 of each request/response, a packet length 316, and fault-tolerant information 318 of the entire packet. The packet type 302 specifies types of packets on a bus. The supported packet types include a memory access read/write request packet, a special command request packet, a memory state query packet, and a response packet. The source module identifier 304 specifies a number of a module (the message-based memory controller or storage module) that sends the message packet. For example, for a system that includes a plurality of message-based memory controller, the source module identifier 304 may specify the identifier of the message-based memory controller that sends a memory access read/write request. The target module identifier 306 specifies a number of a module (the message-based memory controller or storage module) that receives and processes the message packet. The number 308 of included requests/responses specifies the number of requests or responses included in the message packet. It should be noted that the included requests must match the packet type. For example, if the packet type is a memory access read request packet, the requests in the message packet must all be memory access read requests. The length 310, 312, or 314 of each request/response specifies the size of each request or response, helping address the location (offset) of each request or response in the message packet. The packet length 316 specifies the length of the entire message packet. The fault-tolerant information 318 of the entire packet specifies whether an error occurs in the transmission process of the message packet on the bus, including but not limited to using parity check (Parity), checksum (Checksum), error-correcting code (ECC), and other fault-tolerant technologies.

Figure 4:
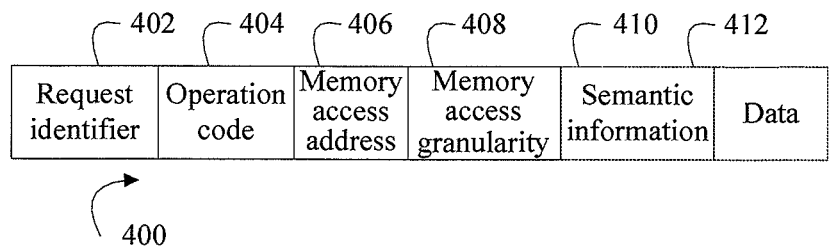
FIG. 4 is a format chart of a memory access read/write request packet according to the present invention.

A memory access read/write request packet is used by the message-based memory controller to send one or more memory access read/write requests 400 to the storage module. Besides a header, as shown in FIG. 4, each memory access read/write request 400 includes a request identifier 402, an operation code 404, a memory access address 406, and a memory access granularity 408, and may further include semantic information 410; besides, a memory access write request further includes data 412. The request identifier 402 is the unique identifier distributed by the message-based memory controller for each request. The operation code 404 specifies a memory request operation, such as a read request or a write request. The memory access address 406 specifies the base physical address of a memory access request. The memory access granularity 408 specifies the granularity (or length) of data of a memory access request, such as the small granularity 8 B or larger granularity 4 KB. The semantic information 410 specifies program-running information that the CPU sends to the storage module through the message-based memory controller and is used to instruct the scheduling of the buffer scheduler in the storage module, such as the priority of a memory access request, the timeout (Timeout) of processing a memory access request, core identifier (Core ID) of the CPU sending the memory access request, and others. The data 412, which is further included in a memory access write request, specifies the data that will be written into the specified physical address.

A special command request packet is used for the message-based memory controller to send special processed commands to the storage module, such as a simple arithmetic and logic operation, move, atomic operation, compression, and the like.

Figure 5:
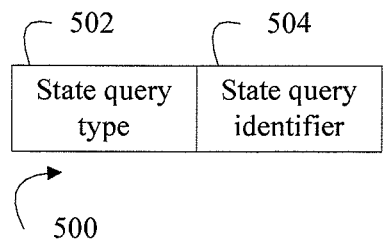
FIG. 5 is a format chart of a state query request packet according to the present invention.

A memory state query packet is used for the message-based memory controller to query for various types of state information on the storage module. Each memory state query packet includes only one query request. Therefore, the number of requests in the request header is always set to 1. As shown in FIG. 5, each state query request 500 includes a state query type 502 and a state query identifier 504. The state query type 502 specifies the type of the queried storage module state, such as whether the read/write request queue is full, whether the special request queue is full, whether the memory chip is in low power consumption state, and the like. The state query identifier 504 is the state query request identifier distributed by the message-based memory controller and is used to address the state query request after the message-based memory controller receives a response from the storage module.

Figure 6:
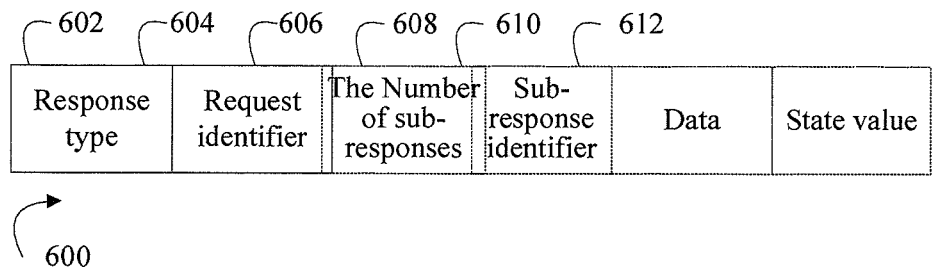
FIG. 6 is a format chart of a response packet according to the present invention.

A response packet is used for the storage module to send one or more returned responses to the message-based memory controller. Besides a header, as shown in FIG. 6, each response 600 includes a response type 602 and a request identifier 604, and may further include the number 606 of sub-responses, a sub-response identifier 608, data 610, or a state value 612. The response type 602 specifies corresponding responses returned for different types of requests, such as a memory access read request response, a state query request response, and others. The request identifier 604 is a corresponding request identifier of a response, such as a memory access read request identifier or a state query request identifier. For a memory access read request response, if data of a larger granularity is requested, the storage module may divide data of one single request into a plurality of sub-responses when returning a response, and the sub-responses may be packaged into one response packet for return or be packaged into a plurality of response packets and returned separately. In this case, the number 606 of sub-responses specifies the number of sub-responses, and the sub-response identifier 608 specifies the identifier of the currently returned sub-response. After the message-based memory controller obtains a specified number of sub-responses from one or more response packets, the memory access read request is processed. A memory access read request response further includes data 610 read from the storage module into the message-based memory controller. A state query request response further includes a returned state value 612 corresponding to the memory, such as that a read/write request queue is full.

Figure 7:
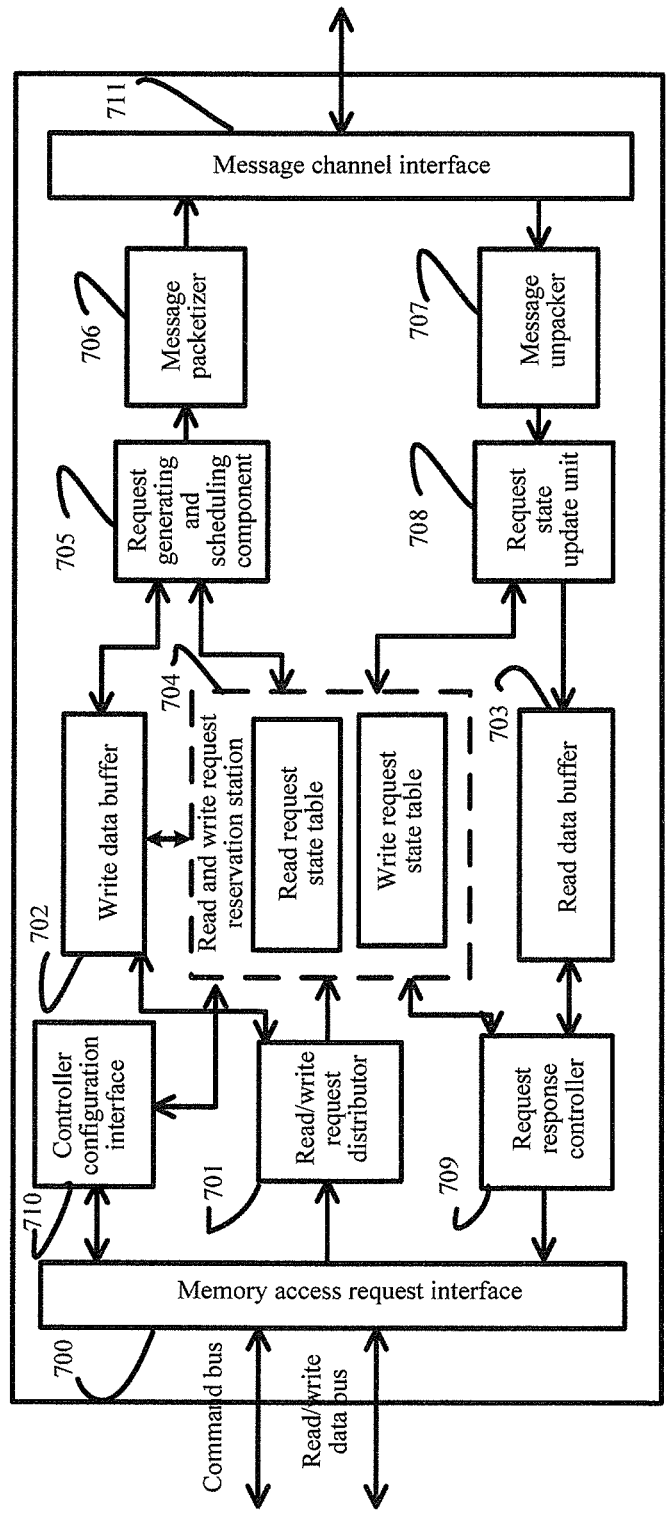
FIG. 7 is a schematic structural diagram of a message-based memory controller according to the present invention.

As shown in FIG. 7, the message-based memory controller includes a memory access request interface 700, a read/write request distributor unit 701, a write data buffer unit 702, a read data buffer unit 703, a read/write request reservation station 704, a request generating and scheduling component 705, a message packetizer 706, a message unpacker 707, a request state update unit 708, a request response controller 709, a controller configuration interface 710, and a message channel interface 711. The message-based memory controller implemented by the units uses message packets to perform interaction with the buffer scheduler and the storage module unit to complete the processing of requests; the message-based memory controller supports the processing of memory access requests with a variable granularity and restricted returning timing. In addition, the message-based memory controller allows data of one read request to be returned in a plurality of message packets in an out-of-order manner. This may improve the utilization rate of a memory bandwidth.

The memory access request interface 700 is the request exchange interface between the CPU and the message-based memory controller; this interface is used for the CPU to send a memory access request to the message-based memory controller and is also used for the message-based memory controller to send a memory access request response to the CPU; besides, this interface may also transmit a command for configuring a message-based memory controller.

The read/write request distributor unit 701, according to a state of the read/write request reservation station, such as the number of memory access requests that the remaining space of the message-based memory controller can contain, controls whether a memory access request received from the memory access request interface may be inserted in the read request state table or the write request state table, as shown in FIG. 8. If a write request is received, data to be written into the memory needs to be temporarily saved in the write data buffer unit 702.

The write data buffer unit 702 is configured to temporarily save data of the write request. When the write request is scheduled, data corresponding to this request needs to be filled into a message packet and sent to the buffer scheduler.

The read data buffer unit 703 is configured to temporarily save data of the read request. Because the message-based memory controller allows data of one request to be returned in a plurality of message packets, data in the read data buffer may be just part of the required data of the request and may be out of order. The read request state table records returned data blocks of each request and the corresponding data location in the read data buffer. In addition, the message-based memory controller has the function of timed returning of a request; therefore, even if all data of a request is temporarily saved in the read data buffer, the request may not be immediately returned.

The read/write request reservation station unit 704 is the key unit for controlling and managing requests; the read/write request reservation station unit 704 consists of a read request state table and a write request state table. The request state table distributes a table entry for each newly received request. When a request is responded to by the buffer scheduler or the message-based memory controller sends a request respond to the CPU, the corresponding table entry in the request state table needs to be updated or deleted.

Table entries in the read request state table are shown in FIG. 8. An item number corresponds to a sequence number of a request in the request state table. The item number is used in the message packet of the message-based memory controller and the buffer scheduler to uniquely specify a request for processing. A request address is the base address of the memory to be accessed. Different from the fixed memory access request length of a conventional message-based memory controller, the message-based memory controller processes a lengthened request to improve the effectiveness of the memory bandwidth. A timed delay specifies the time for returning the request to the CPU and is mainly set through the controller configuration interface. A returning granularity specifies the length of data returned by the message-based memory controller to the CPU each time. A data state specifies required request data that has been obtained from the storage module and required request data that are not obtained. The data location specifies the location of obtained request data in the read data buffer.

The request generating and scheduling component 705, on one hand, is configured to generate a plurality of small requests according to request attributes in the request state table, such as the request length and the timed delay; and on the other hand, is configured to schedule requests, select the request to be processed among unprocessed requests in the read request state table and the write request state table, and send the selected request to the message packetizer 706.

The message packetizer 706 is configured to package one or more requests into the message packet and send the message packet through the message channel interface to the buffer scheduler.

The message unpacker 707 is configured to extract one or more requests from a message packet and parse the corresponding data content of each request.

The request state update unit 708 is configured to update the state table of a request in the read/write request reservation station 704 and temporarily save the data in the read data buffer according to the request and the corresponding data obtained by parsing of by the message unpacker 707.

The request response controller 709 is configured to send a request response to the CPU. The request response controller 709 mainly queries for the state of a request in the read/write request reservation station 704. After a request sent by the CPU is processed by the buffer scheduler and the storage module, the request response controller 709 sends a request response to the CPU. If a read request is processed, the request response controller 709 needs to send the corresponding data of the request in the read data buffer 703.

The controller configuration interface 710 is configured to configure a parameter of the message-based memory controller or specified request attributes, such as a timed delay and the like. For configuration of a request or a memory access address, the corresponding value is updated in the attributes of the read/write request state table.

The message channel interface 711 is configured to transmit message packets with the buffer scheduler. Based on a different physical implementation of the message channel, the message channel interface 711 has a corresponding interface type, such as a shared parallel bus interface or a point to point serial bus interface.

Figure 9:
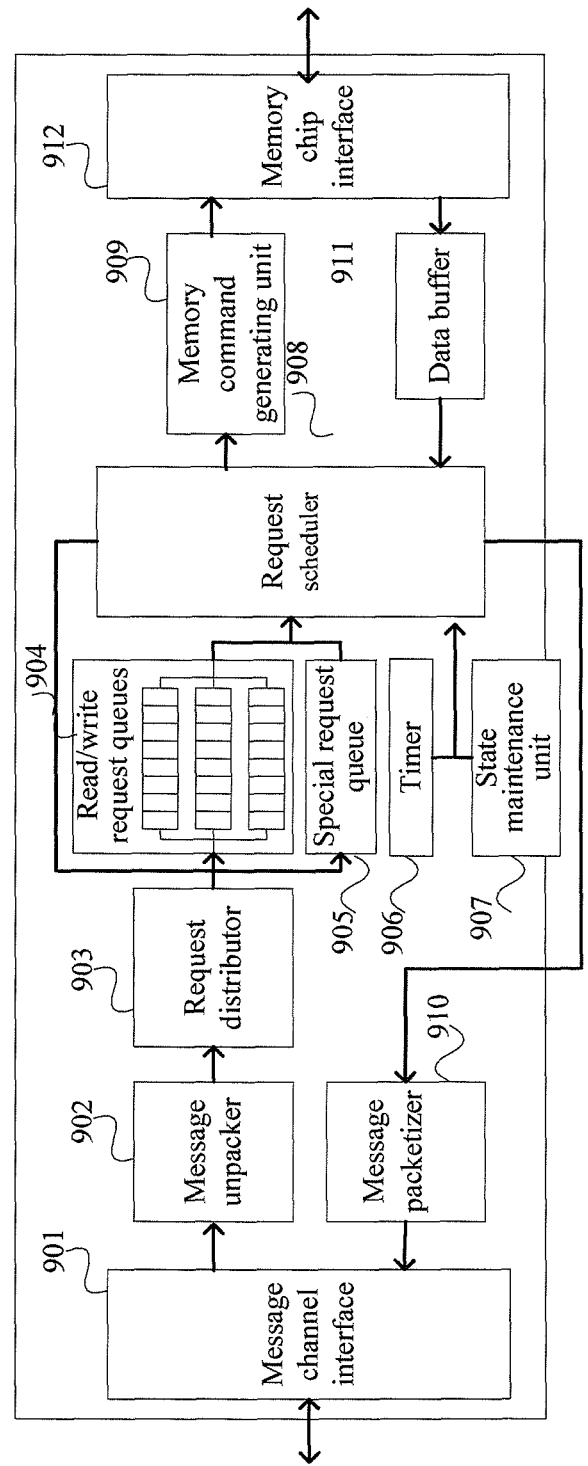
FIG. 9 is a schematic structural diagram of a buffer scheduler in a storage module according to the present invention.

FIG. 9 is a schematic structural diagram of the buffer scheduler in the storage module. As shown in FIG. 9, the buffer scheduler includes a message channel interface 901, a message unpacker 902, a request distributor 903, read/write request queues 904, a special request queue 905, a timer 906, a state maintenance unit 907, a request scheduler 908, a command generating unit 909, a message packetizer 910, a data buffer 911, and a memory chip interface 912.

The buffer scheduler may be an independent integrated circuit chip on the storage module, connected to the memory chip in the storage module. The buffer scheduler may also be a chip on the system main board, connected to a general storage module. The use of the buffer scheduler may be implemented in various hardware manners, such as an application-specific integrated circuit chip, a programmable logical device, and a field programmable gate array. Though the buffer scheduler described in the following is based on FIG. 9, examples implemented in other manners may also be applicable, such as adding an additional module or combining certain functional units of the buffer scheduler.

The message channel interface 901 is configured to transmit message packets with the message-based memory controller. Based on the physical implementation of the message channel, the message channel interface 901 has a corresponding interface type, such as a shared parallel bus interface or a point to point serial bus interface.

The message unpacker 902 is configured to obtain various information from a received message packet, including a request serial number, a request type, request semantic information, an address, data, and the like. Different request types correspond to different message packet formats. After determining the request type, the message unpacker 902 performs the unpacking operation according to the corresponding rules.

The request distributor 903 distributes memory access requests parsed by the message unpacker 902 into different request queues. The scheduling is based on the semantic information, required returning time, and an access data granularity, and other information of each request.

The read/write request queues 904 are configured to save unprocessed read/write requests and include a plurality of queues with different priorities. A high-priority queue saves read/write requests whose access data is of a small granularity and required returning time is short or read/write requests marked with a high priority; a low-priority queue saves read/write requests whose access data is of a larger granularity and required returning time is long or read/write requests marked with a low priority.

The special request queue 905 is configured to save unprocessed non-read/write requests, such as a logic operation, compression, move, and other operations on data.

The timer 906 may output pulses at different time intervals as required and enables clock triggering for the request scheduler 908 and state maintenance unit 907 as required.

The state maintenance unit 907 is configured to maintain the state of each memory chip connected to the buffer scheduler and issue a power-charging command, a refreshing command, and other commands when required.

The request scheduler 908 obtains a memory access request from a request queue and forwards the request to the command generating unit 909; and obtains returned memory access data from the data buffer and forwards the data to the message packetizer 910. Besides forwarding requests and returned data, the request scheduler 908 performs a series of special operations as required. For example, memory access requests in a high-priority queue generally have a small memory access granularity, and, accordingly, the request scheduler 908 may label a plurality of requests with combination marks. As a result, when all returned data of the requests is saved into the data buffer, the data is forwarded to the message packetizer 910 for being packaged into one response packet. For a request with a large memory access data amount in a low-priority queue, the request scheduler 908 may divide the request processing into several steps and forward the processing result of each step to the message packetizer 910 for being packaged into one response packet and then returned back.

The command generating unit 909 obtains a memory access request that needs to be immediately executed after being scheduled and converts the request into a specific command for accessing a memory chip. To maintain the state of a memory chip, the request scheduler 908 may require the command generating unit 909 to issue a command for maintaining the state of the memory chip.

The message packetizer 910 obtains returned data and the corresponding request serial number from the request scheduler 908, generates a response packet, and sends the packet back to the message-based memory controller. According to the marks for the returned data made by the request scheduler 908, the message packetizer 910 allows a plurality of requests to be packaged into one response packet and sent to the message-based memory controller.

The data buffer 911 saves the returned data about accessing a memory chip. The request scheduler 908 selects the required data and sends the data to the message packetizer 910.

The memory chip interface 912 obtains a command for accessing a memory chip from the command generating unit 909, sends the command to the memory chip on the storage module, and after receiving returned data, saves the data in the data buffer 911.

Figure 10A:
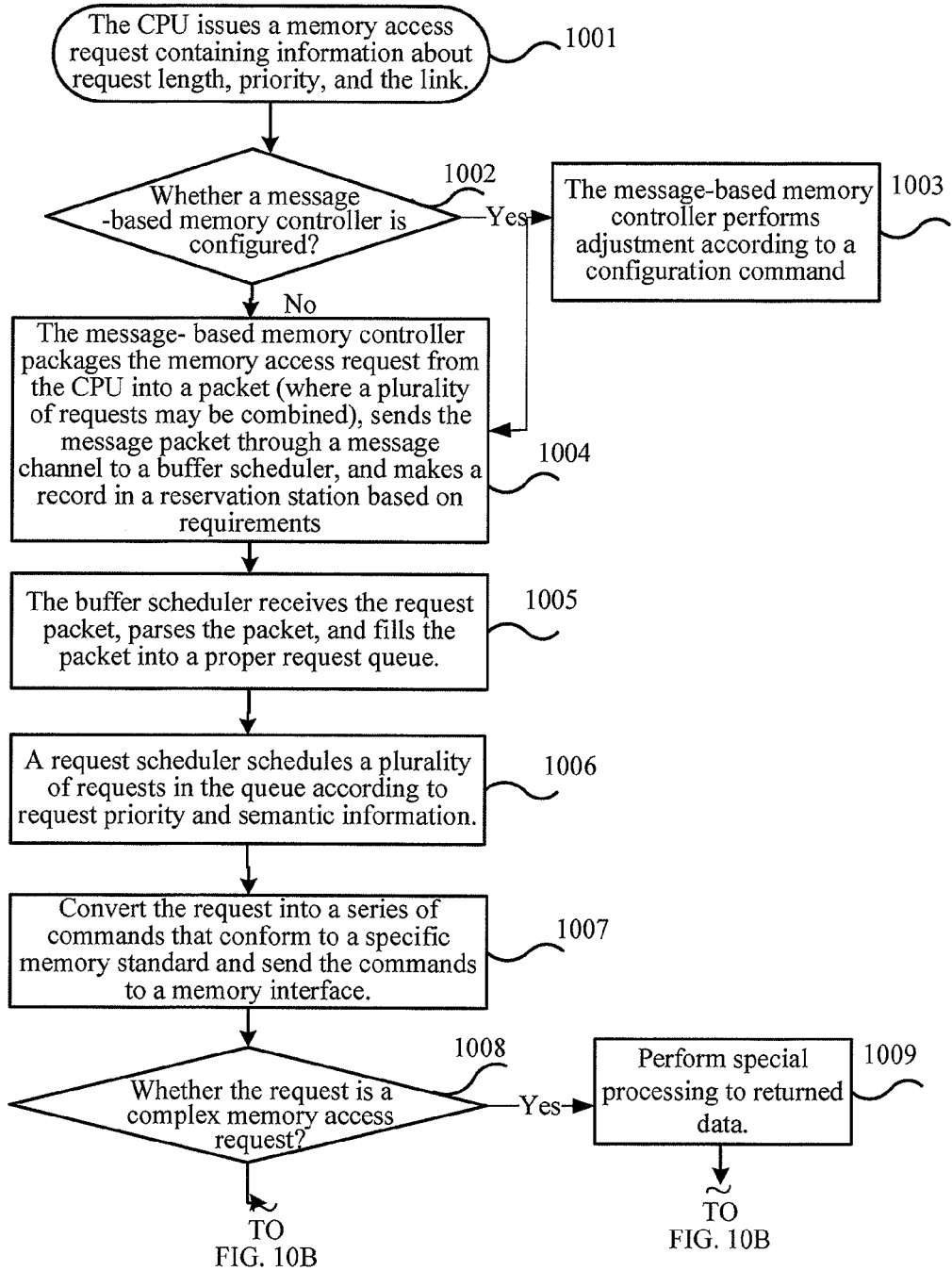
FIG. 10A & FIG. 10B are flowcharts of a message-based memory access method according to the present invention.
Figure 10B:
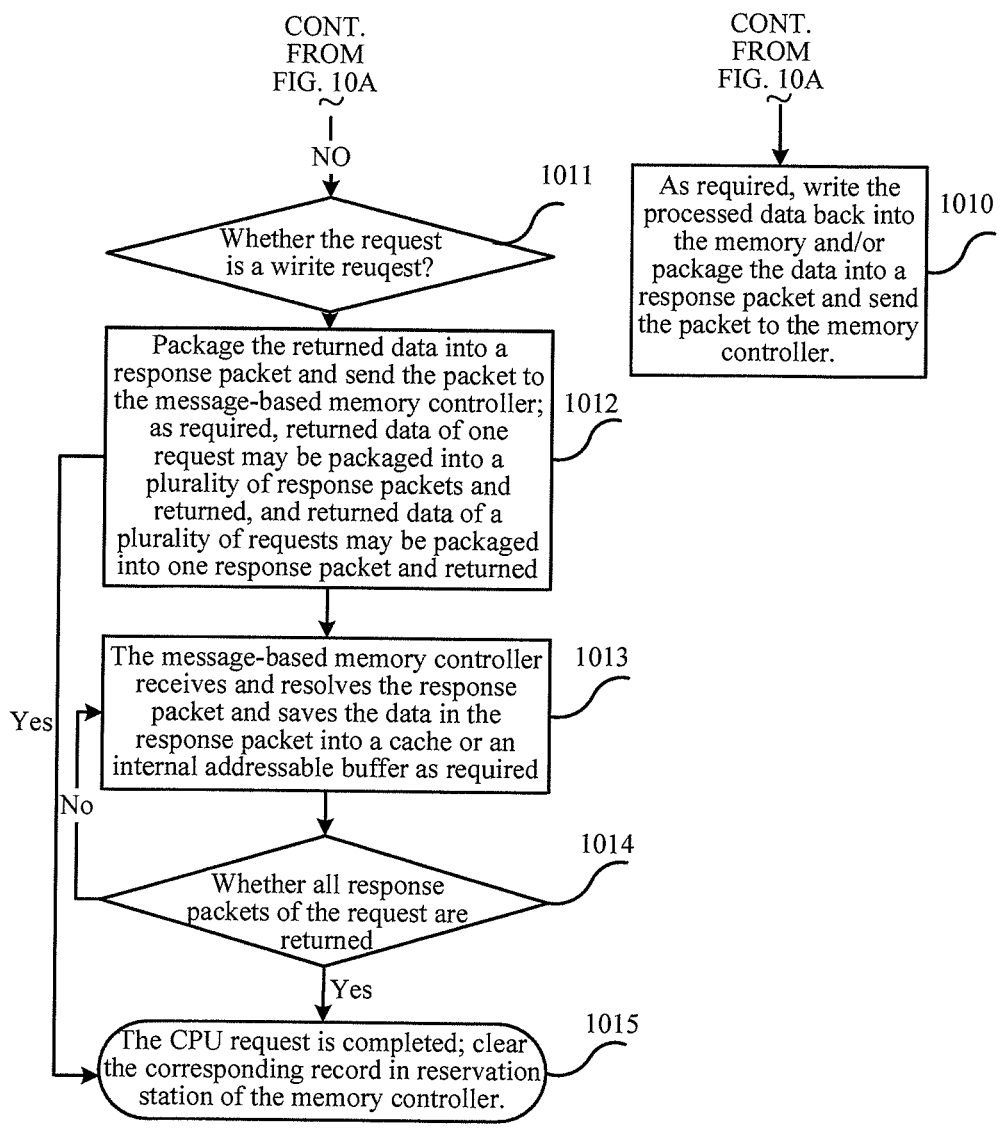

As shown in FIG. 10, a message-based memory access method includes the following steps:

Step 1001: A CPU issues a memory access request. The CPU may specify an access data length, a priority, and semantic information of the request. The request may be any other complex memory access request besides a read/write request, such as timing access, a simple arithmetic and logic operation, move, an atomic operation, compression, and the like.

Step 1002: Determine whether the request includes information about the configuration of a message-based memory controller. If yes, go to step 1003; and if not, go to step 1004.

Step 1003: If the request includes information about the configuration of the message-based memory controller, the message-based memory controller performs a proper adjustment according to the configuration information.

Step 1004: The message-based memory controller packages the memory access request from the CPU into a message packet based on a certain format, which may include a plurality of requests based on certain rules, sends the message packet through a message channel to a buffer scheduler of a corresponding storage module, and makes a record in a read/write request reservation station based on requirements.

Step 1005: The buffer scheduler receives and parses the message packet sent by the message-based memory controller, and fills the memory access request of the CPU into a proper request queue.

Step 1006: The request scheduler in the buffer scheduler schedules a plurality of requests in the request queue according to the memory access request of the CPU priority and semantic information and arranges a sequence of request execution.

Step 1007: Convert the scheduled CPU request, that is, the memory access request of the CPU into a series of commands that conform to a memory granularity standard (such as a DDR standard), and send the commands to a memory interface.

Step 1008: Determine whether the memory access request of the CPU is a complex memory access request. If yes, go to step 1009; and if not, go to step 1011.

Step 1009: If the memory access request of the CPU is a complex memory access request, a processing logic in the buffer scheduler simply processes the data returned by the memory (such as a simple arithmetic, and logic operation, move, and the like).

Step 1010: After the complex memory access instruction is processed, according to the type of the request, determine whether to write the processed data back into the memory and whether to return the process data to the CPU. If the processed data needs to be written back into the memory, use a series of commands that conform to the memory granularity standard (such as the DDR standard) to write the data into the memory; if the processed data needs to be returned to the CPU, package the data into a response packet and send the packet to the message-based memory controller.

Step 1011: If the memory access request of the CPU is not a complex memory access request, determine whether the request is a write request. If yes, go to step 1015; and if not, go to step 1012.

Step 1012: If the request from the CPU is a read request, package the read data into a response packet and send the packet to the message-based memory controller through the message channel. During the response packet packaging process, based on requirements, returned data of one request may be packaged into a plurality of response packets, and returned data of a plurality of requests may be packaged into one response packet.

Step 1013: The message-based memory controller receives and parses the response packet and saves the data in the response packet into a cache or an internal addressable buffer of the message-based memory controller according to requirements.

Step 1014: The message-based memory controller determines whether the response packet of the memory access request of the CPU is entirely returned. If yes, go to step 1015; and if not, go to step 1013.

Step 1015: After the memory access request of the CPU is processed, if there is a record about the request in the read/write request reservation station of the message-based memory controller, clear the record.

Figure 11:
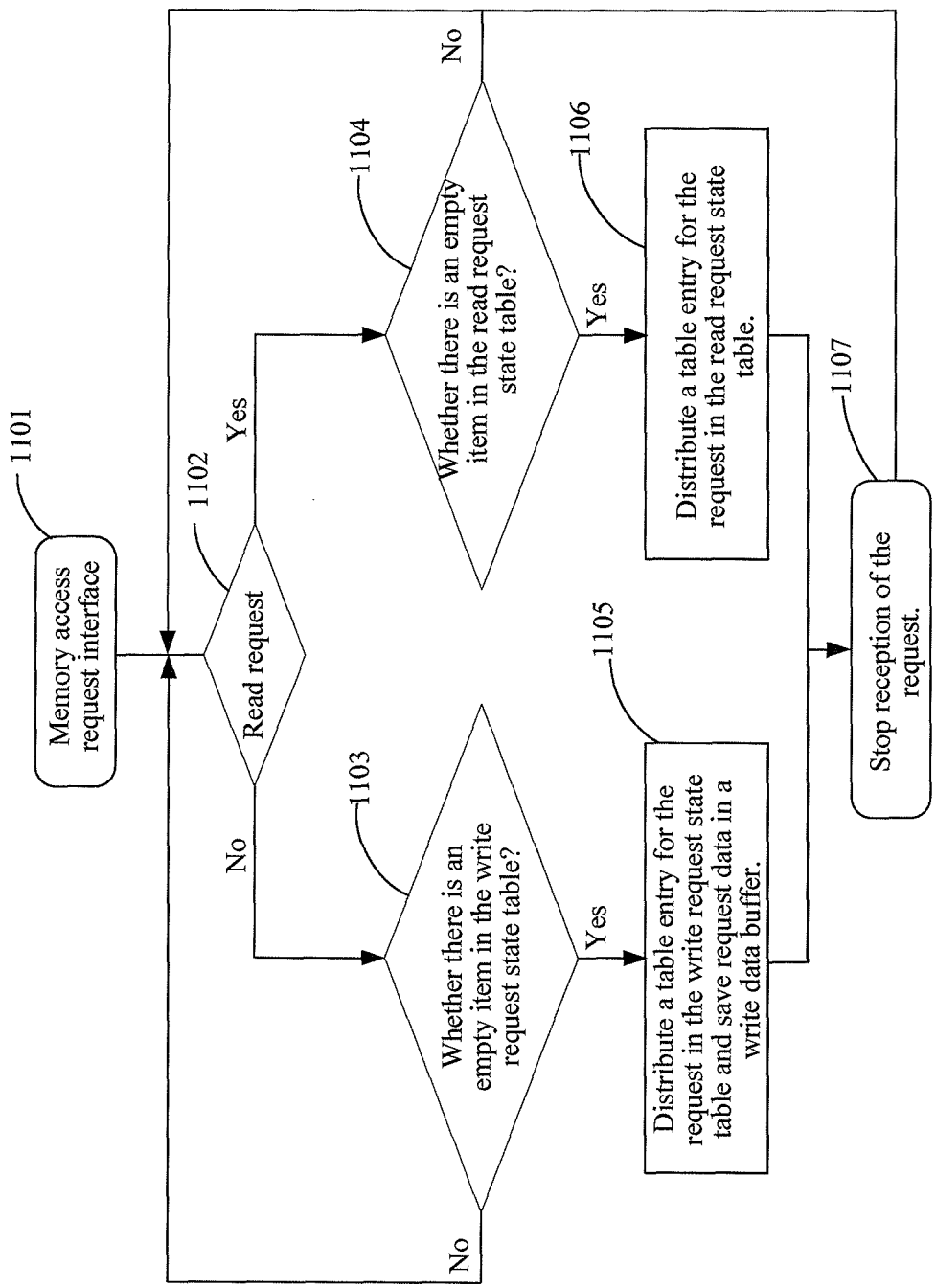
FIG. 11 is a flowchart of receiving a memory access request by a message-based memory controller according to the present invention.

As shown in FIG. 11, the processing procedure for a message-based memory controller to receive a memory access request is as follows:

Step 1101: The message-based memory controller receives a read/write request sent by a CPU through a memory access request interface.

Step 1102: A read/write request distributor 701 determines whether the request is a read request. If yes, go to step 1104; and if not, go to step 1103.

Step 1103: If the received request is a write request, determine whether there is an empty item in a write request state table. If yes, go to step 1105; and if not, go to step 1102.

Step 1104: If the received request is a read request, determine whether there is an empty item in a read request state table. If yes, go to step 1106; and if not, go to step 1102.

Step 1105: If the received request is a write request and there is an empty item in the write request state table, distribute a table entry for the request and save the data in the write request into a write data buffer; otherwise, go to step 1102.

Step 1106: If the received request is a read request and there is an empty item in the read request state table, distribute a table entry for the request; otherwise, go to step 1102.

Step 1107: Stop receiving the request and continue to process requests received through a memory access request interface.

Figure 12:
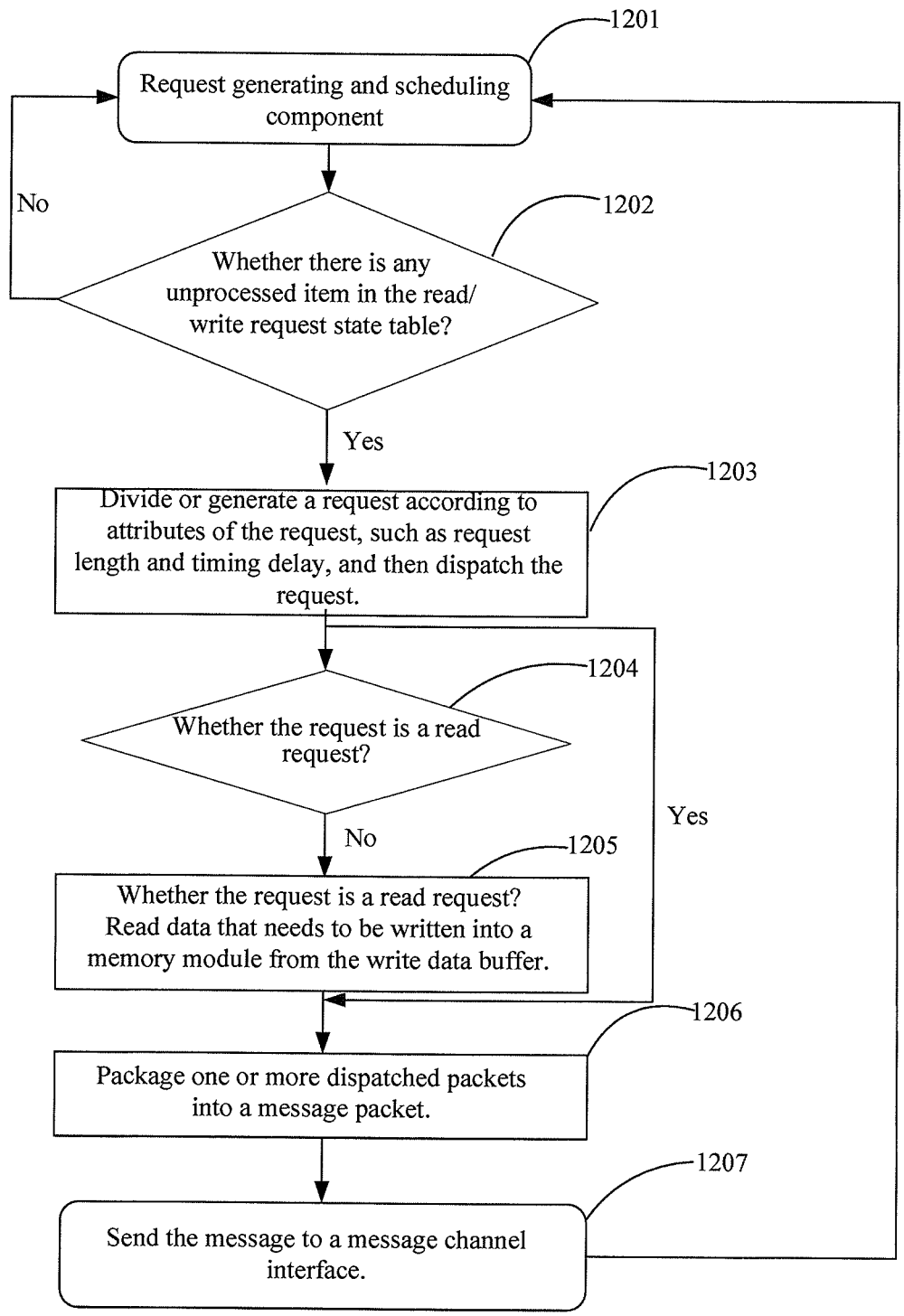
FIG. 12 is a flowchart of scheduling and processing a memory access request by a message-based memory controller according to the present invention.

As shown in FIG. 12, the scheduling and processing a request by the message-based memory controller includes the following steps:

Step 1201: A request generating and scheduling component 705 scans the table entries in a read/write request state table.

Step 1202: The request generating and scheduling component 705 queries whether there is any request that is unprocessed and needs to be processed in the read/write request state table. If yes, go to step 1203; and if not, go to step 1201.

Step 1203: If there is an unprocessed request, the request generating and scheduling component divides a big request into a plurality of small requests according to the request attributes in the corresponding request state table, and selects the next request to be processed according to the scheduling algorithm.

Step 1204: Determine whether the request to be processed is a read request. If yes, go to step 1206; and if not, go to step 1205.

Step 1205: If the request to be processed is a write request, obtain the corresponding data of the request from a write data buffer; otherwise, go to step 1206.

Step 1206: The message packetizer 706 packages one or more requests into a message packet.

Step 1207: Send the packaged message to a message channel interface between the message-based memory controller and a buffer scheduler, and then go to step 1201 for the next processing round.

Figure 13:
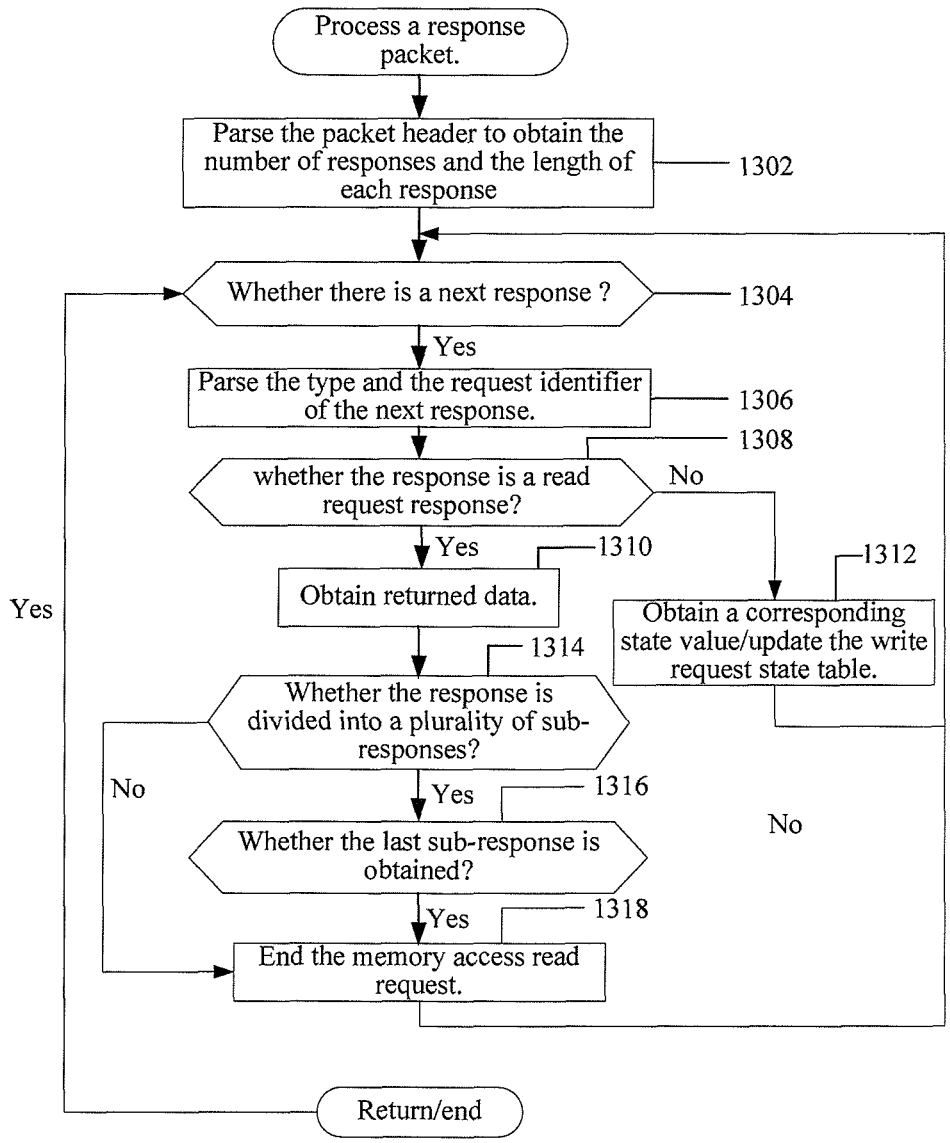
FIG. 13 is a flowchart of receiving and processing a response packet by a message-based memory controller according to the present invention.

As shown in FIG. 13, after the message-based memory controller receives the message packet from the buffer scheduler, the following steps are performed:

Step 1302: Parse header information of the response packet sent from the buffer scheduler to the message-based memory controller so as to obtain the number of responses in the header and the length of each response for parsing the responses one by one.

Step 1304: Determine whether there is a next response that needs to be parsed. If yes, go to step 1306 to parse the next response; and if not, the response packet parsing ends.

Step 1306: Parse the type and the request identifier of the next response. Responses are processed in different ways according to the request types in the following steps.

Step 1308: Determine whether the response is a memory access read request response. If yes, go to step 1310 for further parsing; and if not, the response is a memory state query request response or a memory access write request response, and go to step 1312 to obtain the corresponding state information.

Step 1310: Address the response according to the response length specified by the header and obtain the returned data from the memory access read request response.

Step 1312: Address the response according to the response length specified by the header. If the response is a state query request response, obtain the returned state value from the response; if the response is a memory access write request response, update the request attributes in the write request state table. Then the response parsing ends. Go back to step 1304.

Step 1314: Determine, according to whether the packet includes sub-responses, whether the memory access data of the read request is returned after being divided into a plurality of responses by the buffer scheduler. If the data is not divided into a plurality of responses, the memory access read request is processed, and go to step 1318; if the data is divided, parse the packet to obtain the number of the obtained sub-responses and identifier of the current sub-response, and then go to step 1316.

Step 1316: Determine whether the current response is the last sub-response of the memory access read request according to whether the identifier of the current sub-response is equal to the number of sub-responses. If yes, the current memory access read request is processed, and go to step 1318; and if not, the current memory access read request is not processed yet, write the returned data of the current sub-response into the corresponding data buffer, the update data state, data location, and other information in the read request state table, and then go back to step 1304.

Step 1318: After the current memory access read request is processed, prepare to transmit the data from the message-based memory controller back to the CPU, and then go back to step 1304.

Figure 14:
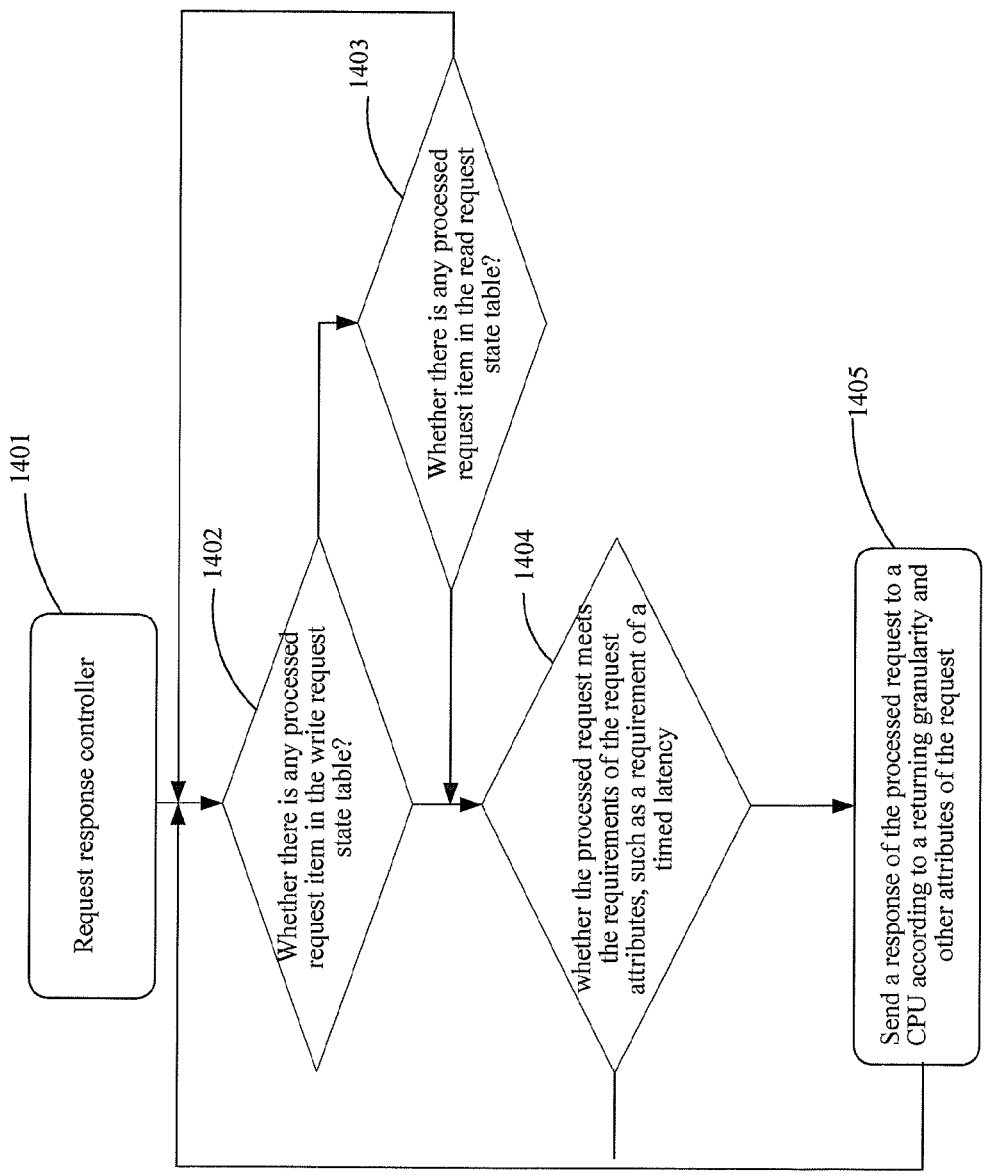
FIG. 14 is a flowchart of responding a request to the CPU by a message-based memory controller according to the present invention.

As shown in FIG. 14, steps for sending a request response to a CPU by a message-based memory controller are as follows:

Step 1401: The request response controller 709 scans the read/write request state table.

Step 1402: Query whether there is any processed request in the write request state table. If yes, go to step 1404; and if not, go to step 1403.

Step 1403: If there is no processed request item in the write request state table, query whether there is any processed request item in the read request state table. If yes, go to step 1404; and if not, go to step 1402.

Step 1404: If there is a processed request in the write request state table or the read request state table, determine whether the processed request meets the requirements of the request attributes, such as a requirement of a timed delay. If yes, go to step 1405; and if not, go to step 1402.

Step 1405: Send a response of the request that meet the requirements of all attributes. The data content of the response also needs to match the returning granularity and other attributes of the request.

Figure 15:
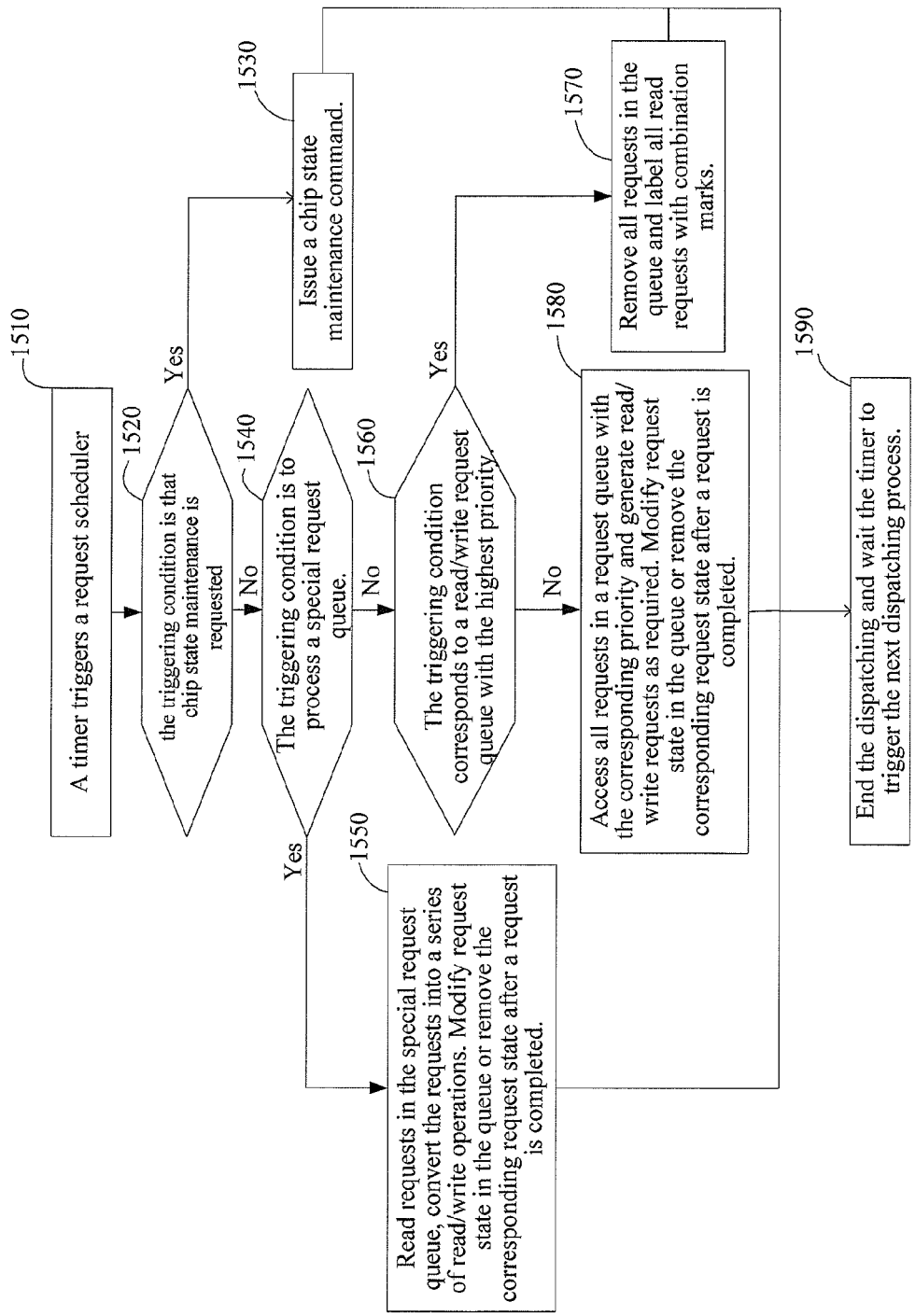
FIG. 15 is a flowchart of scheduling a memory access request by a buffer scheduler according to the present invention.

As shown in FIG. 15, steps for scheduling a memory access request by the request scheduler 908 are as follows:

Step 1510: The timer 906, according to a set condition, triggers the request scheduler 908 to prepare to start a new request scheduling process.

Step 1520: Check whether the triggering condition is that chip state maintenance is requested. If yes, go to step 1530; and if not, go to step 1540.

Step 1530: If the trigger condition is that chip state maintenance is required, issue the chip state maintenance command and go to step 1590.

Step 1540: Check whether the triggering condition is that a special request queue needs to be processed. If yes, go to step 1550; and if not, go to step 1560.

Step 1550: If the triggering condition is that a special request queue needs to be processed, read the request in the special request queue and convert into a series of read/write operations. Modify the request state in the queue or clear the request state after the request is processed. Go to step 1590.

Step 1560: Check whether the triggering condition is that the read/write request queue with the highest priority needs to be processed. If yes, go to step 1570; and if not, go to step 1580.

Step 1570: If the triggering condition is that the read/write request queue with the highest priority needs to be processed, clear all requests in the queue and label all read requests with combination marks. Go to step 1590.

Step 1580: The triggering condition is that a read/write request queue that does not have the highest priority needs to be processed. Access the request in the request queue with the corresponding priority and generate the required read/write operation according to the current state of the read/write request. Modify the request state in the queue or clear the request state after the request is processed. Go to step 1590.

Step 1590: The request scheduling process ends. Wait for the triggering of the next scheduling process by the timer.

The descriptions are merely basic descriptions of technical conceptions of the present invention. Any equivalent variation based on the technical solutions in the present invention shall fall within the protection scope of the present invention, such as any new memory technology for a nonvolatile memory and the like.

Persons skilled in the art may make modifications to the foregoing content without departing from the spirit and scope of the present invention specified in claims. Therefore, the protection scope of the prevent invention is not limited to the descriptions but is determined according to the scope specified in claims.

What is claimed is:

1. A message-based memory access apparatus, comprising:
   a central processing unit (CPU);
   a message-based memory controller coupled to the CPU via a message-based command bus; and
   a storage device coupled to the message-based memory controller via a message channel,
   wherein the CPU is configured to generate a message-based memory access request instruction and transmit the message-based memory access request instruction to the message-based memory controller via the message-based command bus, wherein the message-based memory access request instruction instructs the message-based memory controller to perform a memory access operation,
   wherein the message-based memory controller is configured to acquire a message-based memory access request according to the message-based memory access request instruction, set attributes of the message-based memory access request in a request state table, generate a plurality of division requests from the message-based memory access request according to the attributes, package one or more division requests into a message packet, and send the message packet to the storage device via the message channel, and wherein the message-based memory controller is further configured to parse a response packet returned by the storage device via the message channel to obtain data contained in the response packet and return the data to the CPU via the message-based command bus, and
   wherein the storage device is configured to receive the message packet from the message-based memory controller, unpack the message packet to perform the memory access operation, produce the response packet, and send the response packet to the message-based memory controller.

2. The message-based memory access apparatus according to claim 1, wherein the storage device comprises a buffer scheduler, the buffer scheduler is configured to attach the message-based memory access request with information about a data access priority for instructing scheduling of the message-based memory access request in the storage device.

3. The message-based memory access apparatus according to claim 2, wherein the message-based memory controller further comprises:
   a request reservation station, comprising the request state table, configured to assign a table entry in the request state table for the message-based memory access request, update the table entry in the request state table when a buffer scheduler of the storage device responds to the message-based memory access request, and delete the table entry in the request state table when the message-based memory controller sends a response that corresponds to the message-based memory access request to the CPU;
   a request distributor, configured to determine, according to the table entry in the request state table, whether the message-based memory access request is inserted into the request state table, wherein, data to be read from or written to the storage device needs to be temporarily saved in a data buffer when the request is received; and
   the data buffer, configured to temporarily save data of the request.

4. The message-based memory access apparatus according to claim 1, wherein the message-based memory controller comprises:
   a request generator configured to generate the plurality of division requests according to the set attributes in the request state table, and store the plurality of division requests in the request state table;
   a request scheduler configured to schedule the one or more division requests, select a next division request among unprocessed requests generated by the request generator in the request state table, and send the selected division request to a message packetizer;
   the message packetizer, configured to package the one or more division requests into the message packet and send the message packet through a message channel interface to a buffer scheduler of the storage device;
   a message unpacker, configured to extract a request response from the response packet received from the storage device and parse corresponding data of the request response;
   a request state update unit, configured to update a state table entry corresponding to a request in the request reservation station and temporarily save the data in a data buffer of the message-based memory controller, according to the request and the corresponding data obtained by parsing of the message unpacker;
   a request response controller, configured to send the request response to the CPU;
   a controller configuration interface, configured to configure a parameter of the message-based memory controller or specify attributes of the request, wherein corresponding values in the attributes in the request state table are updated after configuration of the request; and
   the message channel interface, configured to transmit the message packet to the buffer scheduler.

5. The message-based memory access apparatus according to claim 3, wherein the request reservation station is further configured to assign an item number to the request in the request state table, wherein the item number is used for the buffer scheduler to uniquely specify the request for processing.

6. The message-based memory access apparatus according to claim 4, wherein the request response controller is further configured to query for a state of the request in the request reservation station, send the request response to the CPU after the request is processed by the storage device, and send corresponding data of the request in the data buffer after the request is processed.

7. The message-based memory access apparatus according to claim 1, wherein the message packet comprises:
a memory access read request packet, a memory access write request packet, a special command request packet, or a memory state query packet.

8. The message-based memory access apparatus according to claim 1, wherein a buffer scheduler in the storage device comprises:
a message channel interface, configured to transmit the message packet received from the message-based memory controller to a message unpacker of the storage device;
the message unpacker, configured to obtain information about a memory access request from the received message packet, wherein the information comprises a request serial number, a request type, request semantic information, required returning time, and granularity information of access data; and perform the unpacking operation according to corresponding rules after determining the request type based on the information about the memory access request;
a request distributor, configured to distribute the memory access request parsed by the message unpacker into a request queue, wherein the distributing operation depends on the request semantic information, the required returning time, and the granularity information of access data of each division request;
a plurality of request queues, configured to save unprocessed division requests, and the unprocessed division requests consist of queues with different priorities, wherein a high-priority queue stores requests whose access data is of a small granularity and the required returning time is short or requests marked with a high priority; and a low-priority queue stores requests whose access data is of a larger granularity and the required returning time is long or requests marked with a low priority;
a request scheduler, configured to obtain the memory access request from the plurality of request queues and forward the memory access request to a command generating unit, and obtain returned memory access data from a data buffer and forward the data to a message packetizer;
the command generating unit, configured to obtain the memory access request that needs to be executed after being scheduled, convert the memory access request into a specific command for accessing a memory chip, and issue a command for maintaining a state of the memory chip as required by the request scheduler;
the message packetizer, configured to obtain returned data and the corresponding request serial number from the request scheduler, generate the response packet, and send the response packet back to the message-based memory controller, wherein, according to marks for the returned data made by the request scheduler, the message packetizer allows a plurality of division responses to be packaged into one response packet and sent to the message-based memory controller;
the data buffer, configured to save returned data about accessing a memory chip, from which the request scheduler selects the required data and sends the data to the message packetizer.

9. The message-based memory access apparatus according to claim 8, wherein:
the buffer scheduler in the storage device further comprises a timer configured to output pulses at different time intervals as required and enable clock triggering for the request scheduler and a state maintenance unit as required; and
the state maintenance unit is configured to maintain the state of each memory chip connected to the buffer scheduler and issue a power-charging command and/or a refreshing command.

10. The message-based memory access apparatus according to claim 8, wherein the request scheduler is further configured to:
complete operations for memory access requests in a high-priority queue according to request situations;
label a plurality of requests with combination marks;
forward the data to the message packetizer for being packaged into one response packet when all returned data of the division responses is saved into the data buffer; and
divide the request processing procedure into several steps and forward the processing result of each step to the message packetizer for being packaged into one response packet with a large memory access data amount in a low-priority queue.

11. The message-based memory access apparatus according to claim 1, wherein the storage device is further used in the following situations:
for a memory access request generated by the message-based memory controller, the storage device is configured to process the request with a plurality of steps and returns a plurality of division responses;
for a plurality of memory access requests generated by the message-based memory controller, the storage device is configured to process all requests and uses one response packet to respond all the requests; and
the storage device is configured to schedule a sequence for executing memory access requests generated by the message-based memory controller according to priorities of requests, semantic information of requests, and a state of a memory chip on the storage device.

12. The message-based memory access apparatus according to claim 1, wherein a memory unit of the storage device is a synchronous memory chip and/or a memory chip based on an asynchronous network connection.

13. The message-based memory access apparatus according to claim 1, wherein the message channel is configured to transmit the one or more division requests in the message packet via a parallel bus, a point to point serial bus, or networks with other topological structures used.

14. The message-based memory access apparatus according to claim 1, wherein:
the message-based command bus is further configured to transmit the message-based memory access request instruction with an access data length specified by the CPU, and the access data length is greater than a length of a register.

15. The message-based memory access apparatus according to claim 1, wherein the attributes comprise at least one of: a timed return delay, a length of the message-based memory access request, an address of the message-based memory access request, return granularity, data state, and data location.

16. The message-based memory access apparatus according to claim 1, wherein the storage device is further configured to:

obtain memory access data based on the message packet;

divide the memory access data into a plurality of sub-responses; and package the plurality of sub-responses into the response packet.

17. A message-based memory access method, comprising:

generating, by a CPU, a memory access request instruction, wherein the memory access request instruction includes an access data length, a priority, and semantic information of the request;

acquiring, by a message-based memory controller, a memory access request according to the memory access request instruction, and determining whether the memory access request comprises information about configuration of the message-based memory controller;

generating, by the message-based memory controller, a plurality of division requests from the memory access request according to the access data length, the priority, and the semantic information of the request, when the memory access request comprises the information about the configuration of the message-based memory controller;

packaging, by the message-based memory controller, one or more division requests into a message packet, sending the message packet through a message channel to a storage device;

parsing, by the storage device, the message packet, and performing an operation on the memory access request;

sending, by the storage device, a response packet to the message-based memory controller via the message channel; and parsing, by the message-based memory controller, the response packet to obtain data contained in the response packet and return the data to the CPU.

18. The message-based memory access method according to claim 17, further comprising:

making, by the message-based memory controller, a record in the message-based memory controller according to requirements when sending the message packet to the storage device;

determining, by the message-based memory controller, whether division responses for the CPU are all returned; and when the division responses for the CPU are all returned, clearing the record, wherein the response packet comprises a plurality of division responses.

19. The message-based memory access method according to claim 17, wherein, after parsing the message packet, the method further comprises:

receiving, by a buffer scheduler of the storage device, the message packet sent by the message-based memory controller, parsing the message packet to obtain memory access request of the CPU, and filling the memory access request of the CPU into a request queue;

scheduling, by the buffer scheduler, a plurality of division requests in the request queue and arranging a request execution sequence according to the information of the memory access request;

converting the scheduled division requests into a series of commands that conform to a memory granularity standard, and sending the commands to a memory interface;

determining whether the memory access request of the CPU is a complex memory access request, wherein the complex memory access request is a memory access request other than a read or write request;

when the memory access request of the CPU is the complex memory access request, processing, by the buffer scheduler, the data returned by the memory;

after the complex memory access instruction is processed, according to a type of the request, determining whether to write the processed data back into the memory and whether to return the processed data to the CPU;

when the processed data needs to be written back into the memory, using the series of commands that conform to the memory granularity standard to write the data into the memory; and when the processed data needs to be returned to the CPU, packaging the processed data into the response packet and sending the response packet to the message-based memory controller.

20. The message-based memory access method according to claim 17, wherein packaging the one or more division requests into the message packet further comprises:

receiving, by the message-based memory controller, a read or write request sent by the CPU through a memory access request interface;

determining, by a read/write request distributor, whether the request is a read request;

when the received request is a write request, determining whether there is an empty item in a write request state table;

when the received request is a read request, determining whether there is an empty item in a read request state table;

when the received request is a write request and there is an empty item in the write request state table, distributing a table entry for the request and saving the data in the write request into a write data buffer; and when the received request is a read request and there is an empty item in the read request state table, distributing a table entry for the request.

* * * * *